(12) United States Patent
Niino

(10) Patent No.: US 6,439,674 B1
(45) Date of Patent: Aug. 27, 2002

(54) VEHICLE BRAKING APPARATUS AND VEHICLE BRAKING METHOD

(75) Inventor: Hiroaki Niino, Toyota (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/652,265

(22) Filed: Aug. 30, 2000

(30) Foreign Application Priority Data

| Sep. 1, 1999 | (JP) | 11-247348 |
| Sep. 7, 1999 | (JP) | 11-253069 |
| Sep. 7, 1999 | (JP) | 11-253070 |

(51) Int. Cl.[7] ............................................. B60T 8/64
(52) U.S. Cl. ................................ 303/152; 180/165
(58) Field of Search .......................... 303/152, 3, 15, 303/115.2, 113.2; 180/165, 65.1–65.5

(56) References Cited

U.S. PATENT DOCUMENTS

| 5,169,215 A | * 12/1992 | Takata ..................... 303/15 X |
| 5,632,534 A | * 5/1997 | Knechtges ................ 303/152 |
| 5,716,108 A | 2/1998 | Asa et al. |
| 5,927,829 A | * 7/1999 | Saga et al. ............... 303/152 |
| 5,967,621 A | * 10/1999 | Ito et al. .................. 303/15 |
| 6,120,115 A | * 9/2000 | Manabe .................... 303/152 |

FOREIGN PATENT DOCUMENTS

| JP | 5-199606 | 8/1993 |
| JP | 8-98315 | 4/1996 |
| JP | 11-48954 | 2/1999 |

* cited by examiner

Primary Examiner—Jack Lavinder
Assistant Examiner—Melanie Torres
(74) Attorney, Agent, or Firm—Law Offices of David G. Posz

(57) ABSTRACT

In attaining a target vehicle braking force corresponding to a pedal depression force, an assigned braking force is obtained by subtracting a minimum braking force of a hydraulic braking device corresponding to the pedal depression force from the target vehicle braking force. Then, a distributive braking force of the hydraulic braking device is obtained by subtracting an actual regenerative braking force from the assigned braking force. And, a boost ratio of the hydraulic braking device is controlled based on a target hydraulic braking force which is a sum of the minimum braking force and the distributive braking force. Thus, the braking force of the hydraulic braking device is always utilized for attaining the target vehicle braking force.

15 Claims, 24 Drawing Sheets

⟨INITIAL/DEPRESSURIZING STATE⟩

⟨PRESSURIZING STATE⟩

⟨HOLDING STATE⟩

FIG. 5
⟨BOOST RATIO INCREASING STATE⟩
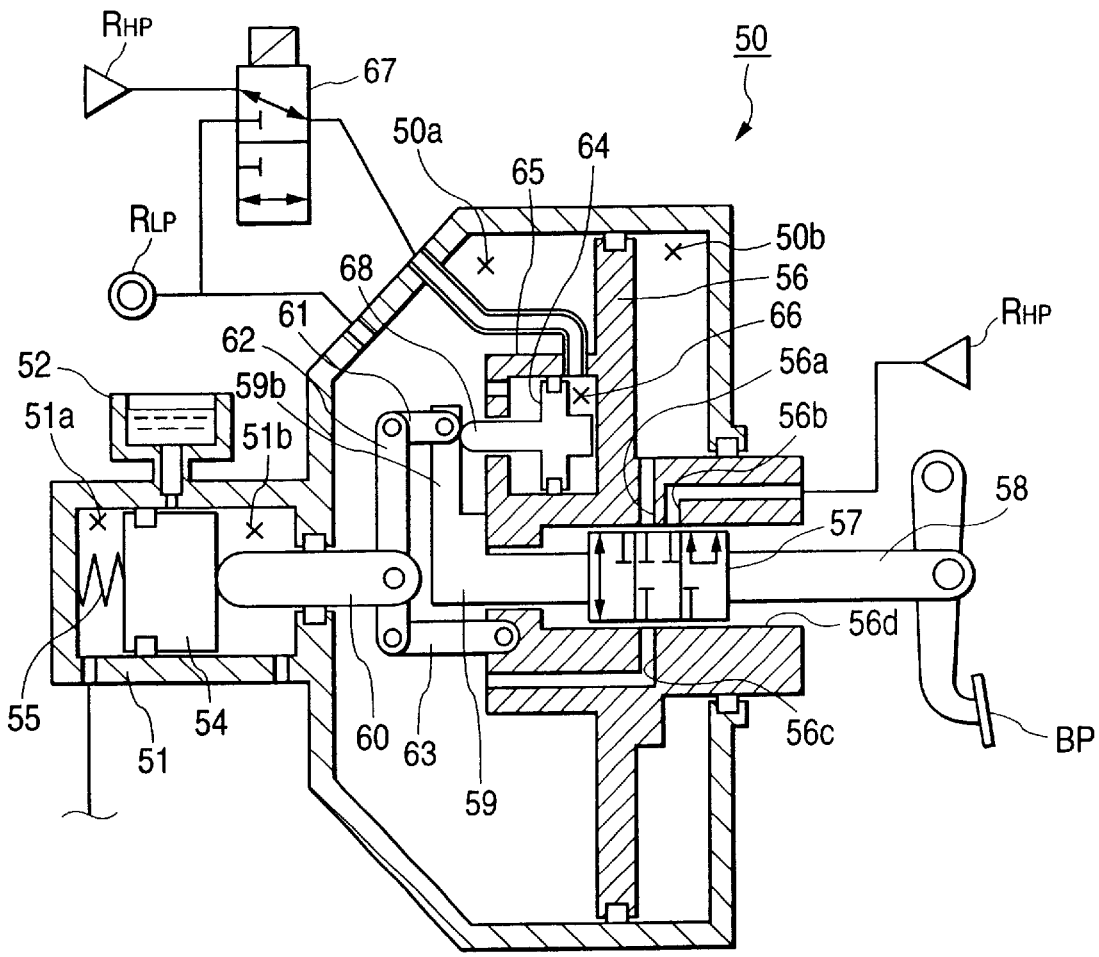
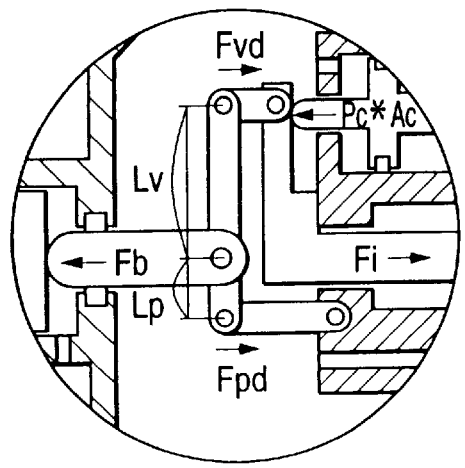

⟨INITIAL/DEPRESSURIZING STATE⟩

⟨PRESSURIZING STATE⟩

⟨HOLDING STATE⟩

⟨BOOST RATIO INCREASING STATE⟩

TO W/C OF EACH WHEEL

VEHICLE BRAKING APPARATUS AND VEHICLE BRAKING METHOD

BACKGROUND OF THE INVENTION

The present invention relates to a vehicle braking apparatus and a vehicle braking method for applying a braking force to a vehicle by summing a braking force of a hydraulic braking device and a braking force of an auxiliary braking device.

Many of motor-driven vehicles, such as electric automotive vehicles and hybrid vehicles, have a regenerative braking device in addition to a hydraulic braking device to effectively utilize the limited energy. The braking force of the hydraulic braking device is referred to as "hydraulic braking force", while the braking force of the regenerative braking device is referred to as "regenerative braking force." This kind of motor-driven vehicles perform a cooperative control wherein the ratio of hydraulic braking force and the regenerative braking force is adequately determined to optimize the braking force applied to the vehicle as well as the storage of regenerative electric power.

FIG. 23 shows a conventional hybrid vehicle which comprises a regeneration ECU 110 sending a drive request value to each of the following electronic control units (i.e., ECUs). A motor ECU 120 controls a motor 170 via an inverter 180 based on the drive request sent from the regeneration ECU 110. The motor 170 drives front wheels of this vehicle. A battery ECU 130 monitors a charging condition of a battery 190 equipped in this vehicle. A brake ECU 140 performs a cooperative control for the regenerative braking device and the hydraulic braking device. The brake ECU 140 sends a control signal to a cooperative control valve system 150 to control the switching of this cooperative control valve system 150. A hydro booster system 160 generates a hydraulic braking force in response to a depression force applied on a brake pedal BP by a driver.

According to this hybrid vehicle, when the brake pedal BP is depressed by the driver, the brake ECU 140 calculates a target vehicle braking force corresponding to a depression amount of the brake pedal BP. In this case, the target vehicle braking force of this hybrid vehicle is substantially equal to a target braking force of an ordinary vehicle having a hydraulic braking device only. Then, the brake ECU 140 calculates a regenerative braking force determined in accordance with the target vehicle braking force. The regenerative braking force obtained by the brake ECU 140 is transmitted to the regeneration ECU 110 as a requested regenerative braking force. The regeneration ECU 110 causes the motor ECU 120 to perform a regenerative control based on the requested regenerative braking force. Then, the regeneration ECU 110 detects an actual regenerative braking force generated by the motor 170. The regeneration ECU 110 returns the detected actual regenerative braking force to the brake ECU 140 as a producible regenerative braking force. In response to this, the brake ECU 140 obtains a hydraulic braking force which is obtained by subtracting the producible regenerative braking force from the target vehicle braking force. Then, the brake ECU 140 obtains a target W/C pressure corresponding to the hydraulic braking force. In this description, W/C stands for "wheel cylinder." The brake ECU 140 controls the switching of the cooperative control valve system 150 so that a W/C pressure of each wheel is equalized to the target W/C pressure.

FIG. 24 shows a schematic arrangement of a hydraulic circuit of this hybrid vehicle. Like a general braking device, the hydro booster system 160 comprises a master cylinder (hereinafter, referred to as "M/C") 161 generating a hydraulic pressure in accordance with a piston stroke, a hydraulic pump 163 supplying a pressurized oil, an accumulator 164 storing the pressurized oil supplied from the hydraulic pump 163, and a regulator 162 adjusting the pressurized oil supplied from the accumulator 164 to the same pressure level as that of the M/C 161 in proportion to a depression force applied on the brake pedal BP. A reservoir 165 is provided to supply the oil to the hydraulic pump 163.

The hydraulic pressure of the regulator 162 is transmitted to each W/C of front right, front left, rear right and rear left wheels via the cooperative control valve system 150. The cooperative control valve system 150 comprises a linear solenoid valve SLA which increases the hydraulic pressure and a linear solenoid valve SLR which decreases the hydraulic pressure. Each of the linear solenoid valves SLA and SLR is opened or closed in response to a control signal supplied from the brake ECU 140 to adjust the pressure level of each W/C. The downstream side of the cooperative control valve system 150 is bifurcated into a front oil passage 166 supplying the oil to the front right W/C and the front left W/C of the front wheels, and a rear oil passage 167 supplying the oil to the rear right W/C and the rear left W/C of the rear wheels. The front oil passage 166 comprises a switching solenoid valve SS which is usually kept open under supply of electric power. The downstream side of the switching solenoid valve SS is bifurcated into an oil passage 168 supplying the oil to the front left W/C of the front left wheel and an oil passage 169 supplying the oil to the front right W/C of the front right wheel. Each of the bifurcated oil passages 168 and 169 has a well-known ABS solenoid valve SABS consisting of a pressure increasing valve SH and a pressure reducing valve SR. Similarly, the rear oil passage 167 has an ABS solenoid valve SABS consisting of a pressure increasing valve SH and a pressure reducing valve SR. Furthermore, the rear oil passage 167 has a P&B valve provided at the downstream side of the ABS solenoid valve SABS.

The hydraulic pressure of M/C 161 is transmitted to the P&B valve and to a stroke simulator SSI generating a pedal stroke in accordance with the depression force applied by the driver. Furthermore, M/C 161 is connected to the front left W/C via a switching solenoid valve SMC1 and to the front right W/C via a switching solenoid valve SMC2. The switching solenoid valves SMC1 and SMC2 are usually kept closed under supply of electric power. Accordingly, the front right W/C and the front left W/C receive the regulator pressure in an ordinary condition.

According to the above-described hybrid vehicle, when the depression amount of the brake pedal BP is small, the regenerative braking force may be sufficient enough to supply all of the required vehicle braking force. In such a case, no hydraulic braking force is required. Accordingly, in the cooperative control valve system 150, the pressure-increasing linear solenoid valve SLA is closed. The switching solenoid valves SMC1 and SMC2 are closed, too. However, when the depression amount of the brake pedal BP is increased, the regenerative braking force may be insufficient to supply all of the required vehicle braking force. In such a case, the hydraulic braking force is required. The linear solenoid valve SLA is opened under the condition where both of the switching solenoid valves SMC1 and SMC2 are closed. Thus, the regulator pressure is supplied to each W/C. However, requiring the hydraulic braking force in this manner may encounter with a system fail wherein the valve SLA is stuck in the closed position and cannot be opened. To solve this situation, the solenoid of each valve is turned off. In this case, the switching solenoid valves SMC1 and SMC2 are opened, and the M/C pressure is transmitted to the front right W/C and to the front left W/C. Thus, the braking force is obtained in accordance with the depression amount of the brake pedal BP.

However, according to the above-described hybrid vehicle, the cooperative control valve system 150 is provided at the downstream side of the hydro booster system 160. Thus, in the installation of the switching solenoid valves SMC1 and SMC2, it is necessary to consider the possibility that the cooperative control valve system 150 or the hydro booster system 160 may be damaged. This significantly complicates the circuit arrangement.

Furthermore, if the regenerative braking device is failed, no regenerative force will be obtained. In such a case, it is necessary to promptly supply the hydraulic braking force.

SUMMARY OF THE INVENTION

In view of the above problems, the present invention has an object to provide a vehicle braking method and a vehicle braking apparatus for realizing the cooperative control without using both the conventional cooperative control valve system and the switching solenoid valves.

The present invention has another object to provide a vehicle braking method and a vehicle braking apparatus for promptly responding to an inoperable condition of the auxiliary braking device.

To accomplish the above and other related objects, the present invention provides a first vehicle braking apparatus for applying a braking force to a vehicle by summing a braking force of a hydraulic braking device and a braking force of an auxiliary braking device.

The first vehicle braking apparatus comprising:

input value detecting means for detecting a brake pedal input value;

target vehicle braking force output means for outputting a target vehicle braking force corresponding to the brake pedal input value detected by the input value detecting means;

assigned braking force output means for outputting an assigned braking force which is obtained by subtracting a minimum braking force of the hydraulic braking device corresponding to the brake pedal input value from the target vehicle braking force generated from the target vehicle braking force output means; and braking control means for obtaining a distributive braking force of the hydraulic braking device which is obtained by subtracting the braking force of the auxiliary braking device from the assigned braking force generated from the assigned braking force output means, and for controlling the hydraulic braking device based on a target hydraulic braking force which is a sum of the minimum braking force and the distributive braking force.

According to the first vehicle braking apparatus of the present invention, in attaining a target vehicle braking force corresponding to a brake pedal input value, an assigned braking force is obtained by subtracting a minimum braking force of the hydraulic braking device corresponding to the brake pedal input value from the target vehicle braking force. Then, a distributive braking force of the hydraulic braking device is obtained by subtracting the braking force of the auxiliary braking device from the assigned braking force. And, the hydraulic braking device is controlled based on a target hydraulic braking force which is a sum of the minimum braking force and the distributive braking force.

With this arrangement, in attaining the target vehicle braking force, the present invention always utilizes the braking force of the hydraulic braking device. In other words, the first vehicle braking apparatus of the present invention does not require to perform the valve switching operation for activating or deactivating the hydraulic braking device. Accordingly, the vehicle braking apparatus of the present invention can execute the cooperative control without using the conventional cooperative control valve system and the switching solenoid valves. Thus, the hydraulic circuit can be simplified.

In the explanation of the present invention, the "target vehicle braking force" is equivalent to a target braking force of an ordinary vehicle which uses the hydraulic braking device only. Furthermore, the "brake pedal input value" is for example a depression force applied on the brake pedal or a stroke length of the brake pedal or a M/C pressure. The "minimum braking force of the hydraulic braking device" is a braking force exceeding a minimum vehicle braking force required in accordance with law regulations. The "auxiliary braking device" is for example a regenerative braking device, an exhaust braking device, or an engine braking device. Furthermore, the "braking force" is used to represent a braking force itself and also conceptually used to encompass similar physical quantities, such as deceleration, which can be identified as being equivalent to the braking force.

In obtaining the assigned braking force, the first vehicle braking apparatus of the present invention does not restrict the distributive ratio between the auxiliary braking device and the hydraulic braking device. However, it is preferably in the first vehicle braking apparatus that all of the assigned braking force is supplied from the auxiliary braking device when the braking force of the auxiliary braking device is not smaller than the assigned braking force and also preferable that the hydraulic braking force is added as a supplement for filling a lack of braking force when the braking force of the auxiliary braking device is smaller than the assigned braking force. In this case, the braking force of the auxiliary braking device is supplied as much as possible for obtaining the assigned braking force. Thus, it becomes possible to suppress the abrasion of the brake pad or the brake shoe.

Furthermore, according to the first vehicle braking apparatus of the present invention, it is preferable that the hydraulic braking device comprises a M/C and a booster provided at the upstream side of the master cylinder and equipped with a boost ratio changing mechanism. And, the braking control means adjusts the boost ratio of the booster when the braking control means controls the hydraulic braking device. In this case, it is possible to equalize the M/C pressure with the W/C pressure in an ordinary braking operation (for example, in an ABS non-operating condition of an ABS equipped vehicle). It is advantageous from the viewpoint of fail safe. The "boost ratio" is defined as a ratio of the booster output to the brake pedal input.

The first vehicle braking apparatus of the present invention does not restrict the mechanism for controlling the boost ratio of the booster. It is however preferable in the first vehicle braking apparatus to use the mechanism capable of changing the boost ratio by forcibly changing a pedal input of the booster or by changing a pressure of operation fluid supplied to an operation chamber of a power piston of the booster. Employing such a mechanism makes it possible to provide a simple arrangement for realizing the variable boost ratio.

According to the first vehicle braking apparatus of the present invention, it is preferable that the auxiliary braking device is a regenerative braking device. Recently, research and development of motor-driven vehicles including the electric motors and the hybrid vehicles is very active. The vehicle braking apparatus of the present invention is preferable in effectively utilizing the energy in this kind of vehicles and in easily solving the system failure. If the regenerative efficiency is considered, it is desirable that all of the assigned braking force is supplied from the regenerative braking device when the braking force of the regenerative braking device is not smaller than the assigned braking force and the hydraulic braking force is added as a supplement for filling a lack of braking force when the braking force of the regenerative braking device is smaller than the assigned braking force.

Furthermore, the present invention provides a first vehicle braking method comprising the steps of:

in attaining a target vehicle braking force corresponding to a brake pedal input value, obtaining an assigned braking force by subtracting a minimum braking force of the hydraulic braking device corresponding to the brake pedal input value from the target vehicle braking force;

obtaining a distributive braking force of the hydraulic braking device by subtracting the braking force of the auxiliary braking device from the assigned braking force; and controlling the hydraulic braking device based on a target hydraulic braking force which is a sum of the minimum braking force and the distributive braking force.

Application of the first vehicle braking method of the present invention is not limited to the first vehicle braking apparatus comprising the above-described various means.

Furthermore, to accomplish the above and other related objects, the present invention provides a second vehicle braking apparatus for applying a braking force to a vehicle by summing a braking force of a hydraulic braking device and a braking force of an auxiliary braking device.

The second vehicle braking apparatus comprising:

input value detecting means for detecting a brake pedal input value;

target vehicle braking force output means for outputting a target vehicle braking force corresponding to the brake pedal input value detected by the input value detecting means;

assigned braking force output means for outputting an assigned braking force which is obtained by subtracting a minimum braking force of the hydraulic braking device corresponding to the brake pedal input value from the target vehicle braking force generated from the target vehicle braking force output means; and auxiliary brake operability judging means for judging whether or not the auxiliary brake device is operable; and braking control means for responding to judgment result of the auxiliary brake operability judging means, wherein when the auxiliary brake operability judging means judges that the auxiliary braking device is operable, the braking control means is for obtaining a distributive braking force of the hydraulic braking device which is obtained by subtracting the braking force of the auxiliary braking device from the assigned braking force generated from the assigned braking force output means, and for controlling the hydraulic braking device based on a target hydraulic braking force which is a sum of the minimum braking force and the distributive braking force, and further when the auxiliary brake operability judging means judges that the auxiliary braking device is inoperable, the braking control means is for controlling the hydraulic braking device based on a target hydraulic braking force which is equal to the target vehicle braking force.

According to the second vehicle braking apparatus of the present invention, in attaining a target vehicle braking force corresponding to a brake pedal input value, when the auxiliary braking device is operable, an assigned braking force is obtained by subtracting a minimum braking force of the hydraulic braking device corresponding to the brake pedal input value from the target vehicle braking force. Then, a distributive braking force of the hydraulic braking device is obtained by subtracting the braking force of the auxiliary braking device from the assigned braking force. And, the hydraulic braking device is controlled based on a target hydraulic braking force which is a sum of the minimum braking force and the distributive braking force. On the other hand, when the auxiliary braking device is inoperable, the hydraulic braking device is controlled based on a target hydraulic braking force which is equal to the target vehicle braking force. Accordingly, the present invention always utilizes the braking force of the hydraulic braking device in attaining the target vehicle braking force. Furthermore, when the auxiliary braking device is inoperable, the hydraulic braking device is immediately controlled based on the target hydraulic braking force which is equal to the target vehicle braking force without calculating the assigned braking force or without inputting the braking force of the auxiliary braking force.

In other words, the second vehicle braking apparatus of the present invention does not require to perform the valve switching operation for activating or deactivating the hydraulic braking device. Accordingly, the second vehicle braking apparatus of the present invention can execute the cooperative control without using the conventional cooperative control valve system and the switching solenoid valves. Furthermore, when the auxiliary braking device is inoperable, the second vehicle braking apparatus of the present invention can promptly supply a required braking force by the hydraulic braking device.

In the explanation of the present invention, the "inoperable condition of the auxiliary braking device" is for example a failure or damage of a regenerative braking device in a case where this regenerative braking device is employed as a the auxiliary braking device of the present invention. In this case, the "inoperable condition of the auxiliary braking device" includes a fully charged condition of the battery.

In obtaining the assigned braking force, the second vehicle braking apparatus of the present invention does not restrict the distributive ratio between the auxiliary braking device and the hydraulic braking device. However, it is preferably in the second vehicle braking apparatus that all of the assigned braking force is supplied from the auxiliary braking device when the braking force of the auxiliary braking device is not smaller than the assigned braking force and also preferable that the hydraulic braking force is added as a supplement for filling a lack of braking force when the braking force of the auxiliary braking device is smaller than the assigned braking force. In this case, the braking force of the auxiliary braking device is supplied as much as possible for obtaining the assigned braking force. Thus, it becomes possible to suppress the abrasion of the brake pad or the brake shoe.

Furthermore, according to the second vehicle braking apparatus of the present invention, it is preferable that the hydraulic braking device comprises a M/C and a booster provided at the upstream side of the master cylinder and equipped with a boost ratio changing mechanism. And, the braking control means adjusts the boost ratio of the booster when the braking control means controls the hydraulic braking device. In this case, it is possible to equalize the M/C pressure with the W/C pressure in an ordinary braking operation (for example, in an ABS non-operating condition of an ABS equipped vehicle). It is advantageous from the viewpoint of fail safe. Namely, in case of failure of the braking control means, the boost ratio of the booster cannot be controlled. However, in such a failed condition, it is possible to apply the hydraulic braking force generated by the M/C pressure (i.e., the minimum braking force) to the vehicle.

The second vehicle braking apparatus of the present invention does not restrict the mechanism for controlling the boost ratio of the booster. It is however preferable to use the mechanism capable of changing the boost ratio by forcibly changing a pedal input of the booster or by changing a pressure of operation fluid supplied to an operation chamber of a power piston of the booster. Employing such a mechanism makes it possible to provide a simple arrangement for realizing the variable boost ratio.

Furthermore, instead of using the booster equipped with the boost ratio adjusting mechanism, the hydraulic braking device of the second vehicle braking apparatus of the present invention can be constituted by a check valve provided in a first oil passage connecting a M/C to a W/C for maintaining a W/C pressure at a level not lower than a M/C pressure and brake fluid supply means for supplying a pressure regulated brake fluid to the W/C. In this case, the braking control means adjusts a pressure level of the brake fluid supplied from the brake fluid supply means to the W/C when the braking control means controls the hydraulic braking device. According to this arrangement, the W/C pressure is always maintained to a level not lower than the M/C pressure by the check valve provided in the first oil passage connecting the M/C to the W/C. Accordingly, when the W/C pressure caused in response to a depression of the brake pedal is lower than the M/C pressure, the check valve operates to maintain the W/C pressure to the level not smaller than the M/C pressure. In other words, when the brake pedal is depressed, the second vehicle braking apparatus of the present invention causes the hydraulic braking device to produce a hydraulic braking force not smaller than a hydraulic braking force generated by the M/C pressure (i.e., minimum braking force). If the braking control means or the brake fluid supply means is failed, the pressure regulated brake fluid will not be supplied to W/C. However, in such a failed condition, the second vehicle braking apparatus of the present invention assures that the hydraulic braking device can supply the minimum braking force.

The adjusting mechanism for adjusting the pressure of the brake fluid supplied to the W/C is not limited to a specific one. For example, it is preferable that the brake fluid supply means comprises a pump for supplying a pressurized brake fluid to the W/C, and a control valve provided in a second oil passage connecting the M/C to the W/C. This arrangement is advantageous in that the a brake fluid supply means can be simply arranged by using the pump and the control valve. In this case, the control valve maintains the W/C pressure at a value larger than the M/C pressure by a valve opening pressure. The valve opening pressure is variable. The braking control means adjusts the valve opening pressure of the control valve to adjust the pressure level of the brake fluid supplied to the W/C.

According to the second vehicle braking apparatus of the present invention, it is preferable that the auxiliary braking device is a regenerative braking device. If the regenerative efficiency is considered, it is desirable that all of the assigned braking force is supplied from the regenerative braking device when the braking force of the regenerative braking device is not smaller than the assigned braking force and the hydraulic braking force is added as a supplement for filling a lack of braking force when the braking force of the regenerative braking device is smaller than the assigned braking force.

Furthermore, the present invention provides a second vehicle braking method for applying a braking force to a vehicle by summing a braking force of a hydraulic braking device and a braking force of an auxiliary braking device. According to the second vehicle braking method, in attaining a target vehicle braking force corresponding to a brake pedal input value, when the auxiliary braking device is operable, an assigned braking force is obtained by subtracting a minimum braking force of the hydraulic braking device corresponding to the brake pedal input value from the target vehicle braking force. Then, a distributive braking force of the hydraulic braking device is obtained by subtracting the braking force of the auxiliary braking device from the assigned braking force. And, the hydraulic braking device is controlled based on a target hydraulic braking force which is a sum of the minimum braking force and the distributive braking force. On the other hand, when the auxiliary braking device is inoperable, the hydraulic braking device is controlled based on a target hydraulic braking force which is equal to the target vehicle braking force. Application of the second vehicle braking method of the present invention is not limited to the second vehicle braking apparatus comprising the above-described means. For example, in attaining a target vehicle braking force corresponding to a brake pedal input value, it is preferable to set the target vehicle braking force corresponding the brake pedal input value beforehand, and then obtain an assigned braking force by subtracting a minimum braking force of the hydraulic braking device from the target vehicle braking force. However, when the assigned braking force is constant (e.g., 0.2 G) regardless of the brake pedal input, it is preferable to directly obtain the distributive braking force of the hydraulic braking device by using this constant value without setting the target vehicle braking force.

Furthermore, to accomplish the above and other related objects, the present invention provides a third vehicle braking apparatus comprising braking control means for performing a cooperative control for applying a braking force to a vehicle by summing a braking force of a hydraulic braking device and a braking force of an auxiliary braking device.

The hydraulic braking device of the third vehicle braking apparatus comprises:
  a check valve provided in a first oil passage connecting a M/C to a W/C for maintaining a W/C pressure at a level not lower than a M/C pressure; and
  brake fluid supply means for supplying a pressure regulated brake fluid to the W/C, and
  the braking control means is for adjusting a pressure level of the brake fluid supplied from the brake fluid supply means to the W/C in accordance with the braking force of the auxiliary braking device.

According to the third vehicle braking apparatus of the present invention, the braking control means performs the cooperative control for applying a braking force to the vehicle by summing a braking force of the hydraulic braking device and a braking force of the auxiliary braking device. The pressure of the brake fluid supplied to the W/C is determined in accordance with the braking force of the auxiliary braking device. Thus, the braking force of the hydraulic braking device is determined in accordance with the braking force of the auxiliary braking device. The third vehicle braking apparatus of the present invention always maintains the W/C pressure to a level not lower than the M/C pressure by the check valve provided in the first oil passage connecting the M/C to the W/C. Accordingly, when the W/C pressure caused in response to a depression of the brake pedal is lower than the M/C pressure, the check valve operates to maintain the W/C pressure to the level not smaller than the M/C pressure. In other words, when the brake pedal is depressed, the third vehicle braking apparatus of the present invention causes the hydraulic braking device to produce a hydraulic braking force not smaller than a hydraulic braking force generated by the M/C pressure (i.e., minimum braking force). The maximum value of the braking force of the auxiliary braking device is obtained by subtracting the minimum braking force of the hydraulic braking device from the vehicle braking force. If the braking control means or the brake fluid supply means is failed, the pressure regulated brake fluid will not be supplied to W/C. However, in such a failed condition, the third vehicle braking apparatus of the present invention assures that the hydraulic braking device can supply the minimum braking force.

Accordingly, the third vehicle braking apparatus of the present invention does not require to perform the valve switching operation for activating or deactivating the hydraulic braking device. Thus, the third vehicle braking apparatus of the present invention can execute the cooperative control without using the conventional cooperative control valve system and the switching solenoid valves. The hydraulic circuit can be simplified. Furthermore, from the view point of fail safe, providing the check valve is advantageous compared with the conventional hydraulic circuit.

The brake fluid supply means of the third vehicle braking apparatus of the present invention is not restricted to a specific one as far as it can supply the pressurized brake fluid regulated by the braking control means to the W/C. For example, it is preferable that the brake fluid supply means comprises a pump for supplying a pressurized brake fluid to the W/C, and a control valve provided in a second oil passage connecting the M/C to the W/C. This arrangement is advantageous in that the brake fluid supply means can be simply arranged by using the pump and the control valve. In this case, the control valve maintains the W/C pressure at a value larger than the M/C pressure by a valve opening pressure. The valve opening pressure is variable. The braking control means adjusts the valve opening pressure of the control valve to adjust the pressure level of the brake fluid supplied to the W/C.

For example, as a practical arrangement, it is preferable that the third vehicle braking apparatus of the present invention comprises:

input value detecting means for detecting a brake pedal input value;

target vehicle braking force output means for outputting a target vehicle braking force corresponding to the brake pedal input value detected by the input value detecting means; and assigned braking force output means for outputting an assigned braking force which is obtained by subtracting a minimum braking force of the hydraulic braking device corresponding to the brake pedal input value from the target vehicle braking force generated from the target vehicle braking force output means, wherein the braking control means is for obtaining a distributive braking force of the hydraulic braking device which is obtained by subtracting the braking force of the auxiliary braking device from the assigned braking force generated from the assigned braking force output means, and for controlling the brake fluid supply means of the hydraulic braking device based on a target hydraulic braking force which is a sum of the minimum braking force and the distributive braking force.

In this case, in attaining a target vehicle braking force corresponding to a brake pedal input value, an assigned braking force is obtained by subtracting a minimum braking force of the hydraulic braking device corresponding to the brake pedal input value from the target vehicle braking force. Then, a distributive braking force of the hydraulic braking device is obtained by subtracting the braking force of the auxiliary braking device from the assigned braking force. And, the brake fluid supply means of the hydraulic braking device is controlled based on a target hydraulic braking force which is a sum of the minimum braking force and the distributive braking force. The "minimum braking force of the hydraulic braking device" is a hydraulic braking force caused by the M/C pressure which is always produced for attaining the target vehicle braking force.

In obtaining the assigned braking force, the third vehicle braking apparatus of the present invention does not restrict the distributive ratio between the auxiliary braking device and the hydraulic braking device. However, it is preferably in the third vehicle braking apparatus that all of the assigned braking force is supplied from the auxiliary braking device when the braking force of the auxiliary braking device is not smaller than the assigned braking force and also preferable that the hydraulic braking force is added as a supplement for filling a lack of braking force when the braking force of the auxiliary braking device is smaller than the assigned braking force. In this case, the braking force of the auxiliary braking device is supplied as much as possible for obtaining the assigned braking force. Thus, it becomes possible to suppress the abrasion of the brake pad or the brake shoe.

The third vehicle braking apparatus of the present invention controls the W/C pressure to be not smaller than the M/C pressure. The check valve is always closed. Accordingly, when the driver depresses the brake pedal, the M/C pressure increases. However, the pedal stroke becomes very small or does not increase because the brake fluid remains continuously in the M/C. Thus, the driver may feel strange. When the assigned fluid pressure (i.e., a distributive braking force of the hydraulic braking device relative to the assigned braking force) is reduced due to the regenerative cooperation, the oil equivalent to the reduced M/C pressure returns to the M/C. Thus, the pedal is returned back correspondingly. The relationship between the vehicle deceleration and the pedal stroke is undesirably changed in accordance with a distribution ratio between the auxiliary braking force and the hydraulic braking force of the assigned braking force. Thus, the driver may feel strange. To solve these problems, according to the third vehicle braking apparatus of the present invention, it is preferable that the M/C is connected to a stroke simulator causing a pedal stroke according to the brake pedal input. This arrangement is preferable in that excellent brake feeling is obtained by the function of the stroke simulator.

According to the third vehicle braking apparatus of the present invention, it is preferable that the auxiliary braking device is a regenerative braking device. If the regenerative efficiency is considered, it is desirable that all of the assigned braking force is supplied from the regenerative braking device when the braking force of the regenerative braking device is not smaller than the assigned braking force and the hydraulic braking force is added as a supplement for filling a lack of braking force when the braking force of the regenerative braking device is smaller than the assigned braking force.

BRIEF DESCRIPTION OF THE DRAWINGS

The above and other objects, features and advantages of the present invention will become more apparent from the following detailed description which is to be read in conjunction with the accompanying drawings, in which:

FIG. 5 is a diagram showing a boost ratio increasing state of the hydraulic circuit arrangement in accordance with the first and third embodiments of the present invention;

DESCRIPTION OF PREFERRED EMBODIMENTS

Preferred embodiments of the present invention will be explained hereinafter with reference to attached drawings.

First Embodiment

Figure 1:
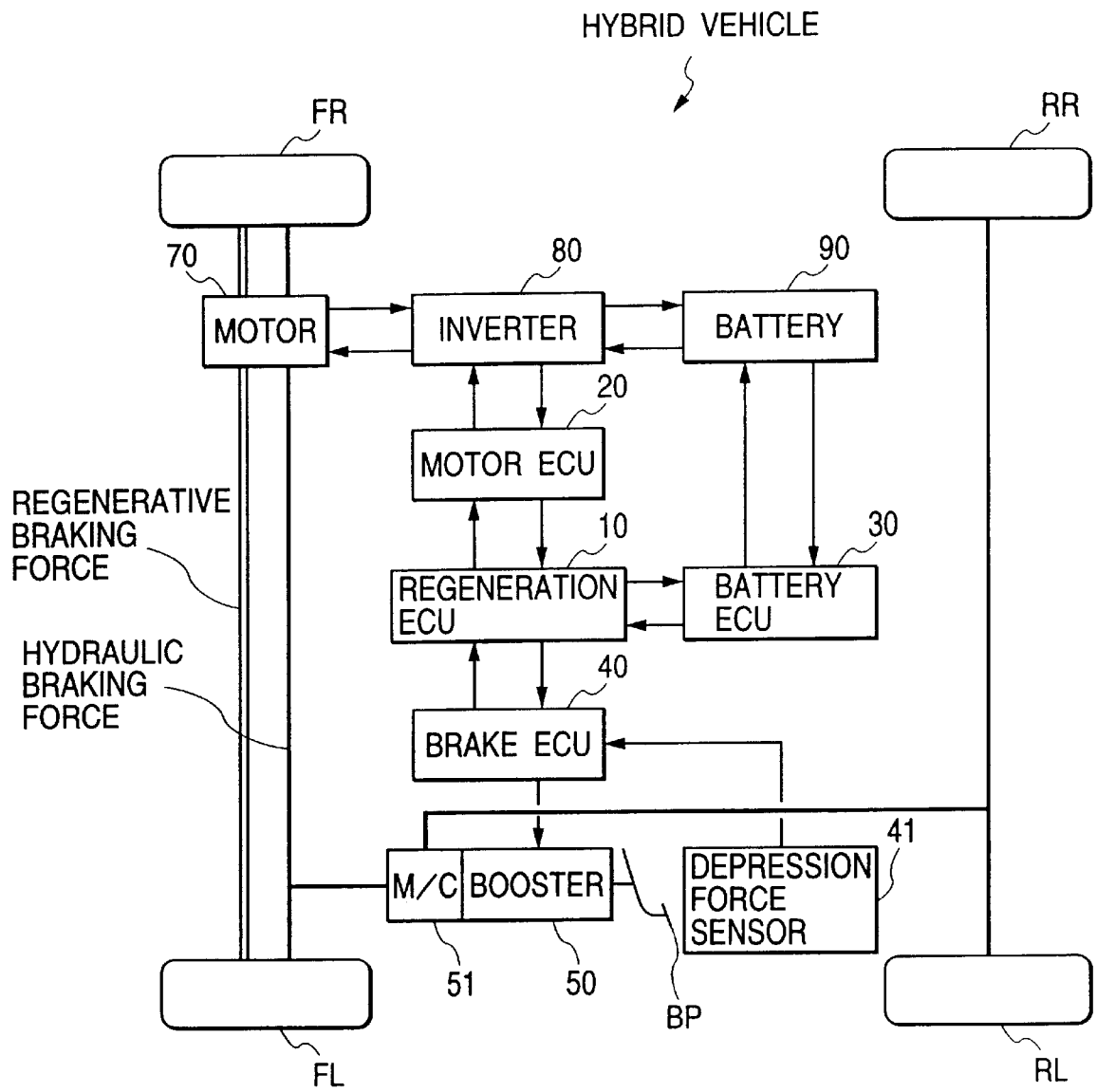
FIG. 1 is a block diagram schematically showing the system arrangement of a hybrid vehicle in accordance with first and third embodiments of the present invention.
Figure 2:
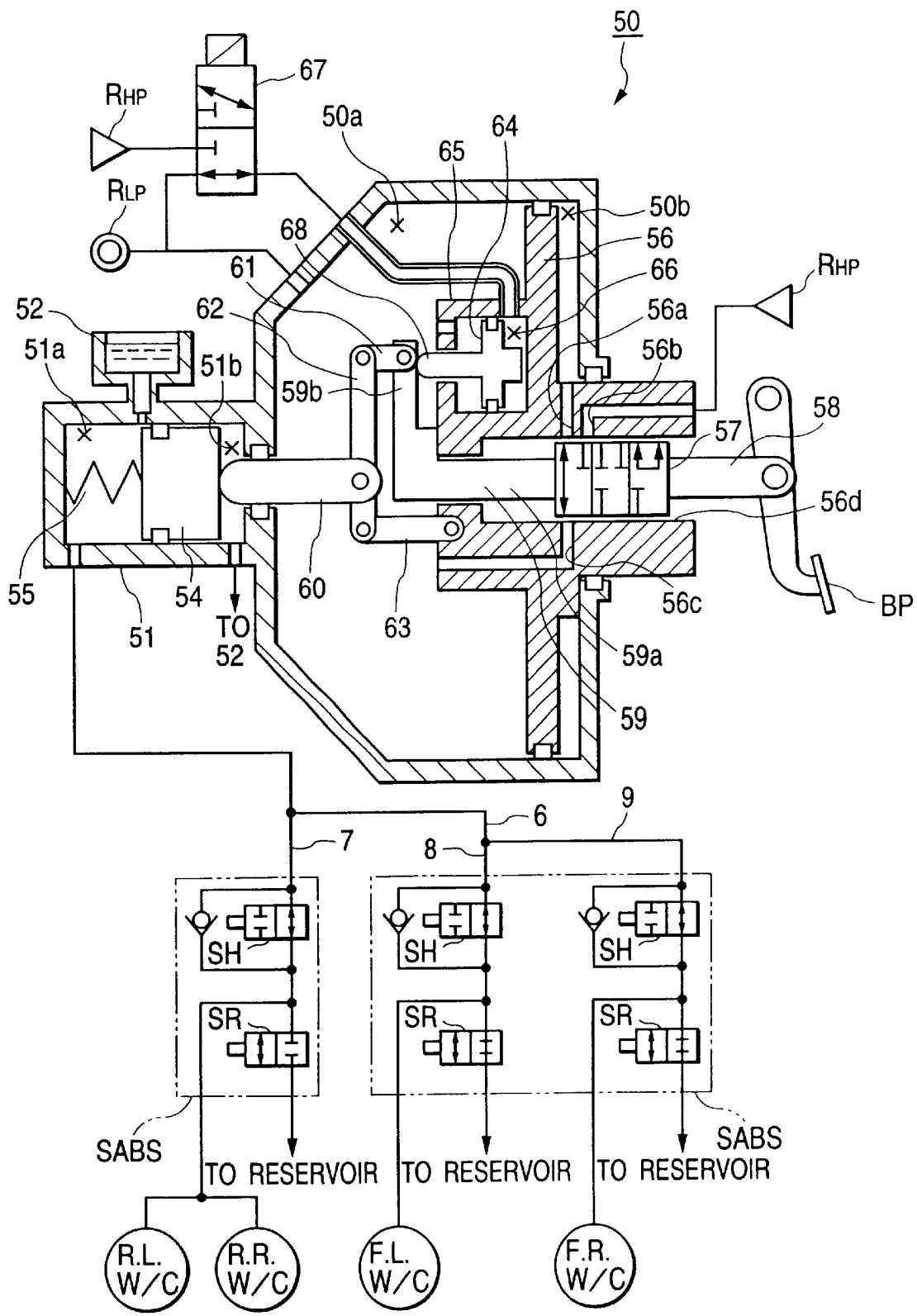
FIG. 2 is a diagram showing an initial/depressurizing state of a hydraulic circuit arrangement in accordance with the first and third embodiments of the present invention.

FIG. 1 is a block diagram showing a system arrangement of a vehicle braking apparatus in accordance with the first embodiment of the present invention. FIG. 2 is a diagram showing a hydraulic circuit arrangement for the vehicle braking apparatus in accordance with the first embodiment of the present invention. As shown in FIG. 1, the hybrid vehicle comprises a regeneration ECU 10 sending a drive request value to each of the following control units (i.e., ECUs). A motor ECU 20 controls a motor 70 via an inverter 80 in accordance with the drive request value sent from the regeneration ECU 10. A battery ECU 30 monitors a charging condition of a battery 90 equipped in this vehicle. A brake ECU 40 performs a cooperative control for the regenerative braking device and the hydraulic braking device based on a sensing signal of a depression force sensor 41. The sensing signal of the depression force sensor 41 is a depression force applied on the brake pedal BP. A vacuum booster 50 generates a hydraulic braking force in response to the depression force applied on the brake pedal BP by a driver. A boost ratio of the vacuum booster 50 is controlled in accordance with a control signal sent from the brake ECU 40. The motor 70 drives a front right wheel FR and a front left wheel FL. The inverter 80 converts the discharge power (i.e., DC power) of the battery 90 into AC power in accordance with a control signal sent from the motor ECU 20. The produced AC power is supplied to the motor 70. Furthermore, the inverter 80 converts the AC power generated by the motor 70 into charging power (i.e., DC power) in accordance with a control signal sent from the motor ECU 20. The produced DC power is used to charge the battery 90.

The hydraulic circuit including M/C 51 and vacuum booster 50 will be explained with reference to FIG. 2.

The M/C 51 comprises a M/C piston 54 which is accommodated in an inside space of M/C 51 and is hermetically slidable in the axial direction. A return spring 55 is provided in the side space of M/C 51 to resiliently urge the M/C piston 54 in a rearward direction (i.e., in a rightward direction in FIG. 2). The inside space of M/C 51 is partitioned into a front M/C chamber 51a and a rear M/C chamber 51b. The front M/C chamber 51a communicates via a front oil passage 6 with a W/C of the front right wheel FR and a W/C of the front left wheel FL, and also communicates via a rear oil passage 7 with a W/C of the rear right wheel RR and a W/C of the rear left wheel RL. The front oil passage 6 is bifurcated into a branch oil passage 8 connected to the W/C of the front left wheel FL and a branch oil passage 9 connected to the W/C of the front right wheel FR. A well-known ABS solenoid valve SABS, consisting of a pressure increasing valve SH and a pressure reducing valve SR, is provided in each of the branch oil passages 8 and 9. Similarly, the ABS solenoid valve SABS is provided in the rear oil passage 7.

A reservoir 52 always communicates with the rear M/C chamber 51b. The reservoir 52 is connected to or disconnected from the front M/C chamber 51a in accordance with the position of the M/C piston 54. More specifically, the reservoir 52 communicates with the front M/C chamber 51a in an initial condition or in a depressurizing phase. On the other hand, the reservoir 52 is disconnected from the front M/C chamber 51a in other conditions (e.g., in a pressurizing phase or in a pressure holding phase).

The vacuum booster 50 is provided at the upstream side of the M/C 51. The vacuum booster 50 comprises a built-in power piston 56. The power piston 56 is accommodated in an inside space of the vacuum booster 50 so as to be hermetically slidable along a large-diameter portion in an axial direction of the vacuum booster 50. The power piston 56 partitions the inside space of the vacuum booster 50 into a front booster chamber 50a and a rear booster chamber 50b. The front booster chamber 50a always communicates with a low-pressure source $R_{LP}$ (e.g., an intake manifold or a vacuum pump). The power piston 56 comprises a pressure regulating valve 57 which is accommodated in a through hole 56d and is slidable in the axial direction. A rear end of the pressure regulating valve 57 is connected to a pedal input shaft 58. The brake pedal BP is swingably supported by the rear end of the pedal input shaft 58. A front end of the pressure regulating valve 57 is connected to a valve plunger 59. The valve plunger 59 comprises a shaft portion 59a extending in the axial direction of the through hole 56d and a bent portion 59b extending in a radial direction from the front end of the shaft portion 59a. The front end of the bent portion 59b supports one end of a first lever 61 so that the first lever 61 is swingable about the bent portion 59b. The other end of the first lever 61 supports one end of a second lever 62 so that the second lever 62 is swingable about the first lever 61. The other end of the second lever 62 supports one end of a third lever 63 so that the third lever 63 is swingable about the second lever 62. The other end of the third lever 63 is swingably supported by the power piston 56. The second lever 62 extends across the central axis of the power piston 56 and swingbly supports a booster output shaft 60. The booster output shaft 60 extends along the central axis of the power piston 56. The booster output shaft 60 extends in a through hole connecting the front booster chamber 50a to the rear M/C chamber 51b so as to be hermetically slidable in an axial direction. By the resilient force of the return spring 55, the M/C piston 54 is always brought into contact with the booster output shaft 60.

A first port 56a communicating with the rear booster chamber 50b, a second port 56b communicating a high-pressure source $R_{HP}$ (e.g., atmosphere), and a third port 56c communicating with the front booster chamber 50a are provided on an inside wall of the through hole 56d of the power piston 56. A sub cylinder 65, provided at a front position of the power piston 56, faces to the bent portion 59b of the valve plunger 59. The sub cylinder 65 accommodates a reaction force adjusting piston 64 in an inside space thereof so as to be hermetically slidable in the axial direction. The inside space of the sub cylinder 65 is partitioned into front and rear chambers by the reaction force adjusting piston 64. The front chamber of the sub cylinder 65 communicates with the front booster chamber 50a. The rear chamber of the sub cylinder 65, serving as a reaction force adjusting chamber 66, communicates with either the low-pressure source $R_{LP}$ or the high-pressure source $R_{HP}$ via a reaction force adjusting solenoid valve 67. A reaction force adjusting plunger 68 integral with the reaction force adjusting piston 64 selectively contacts with or separates from the bent portion 59b of the valve plunger 59.

Figure 6:
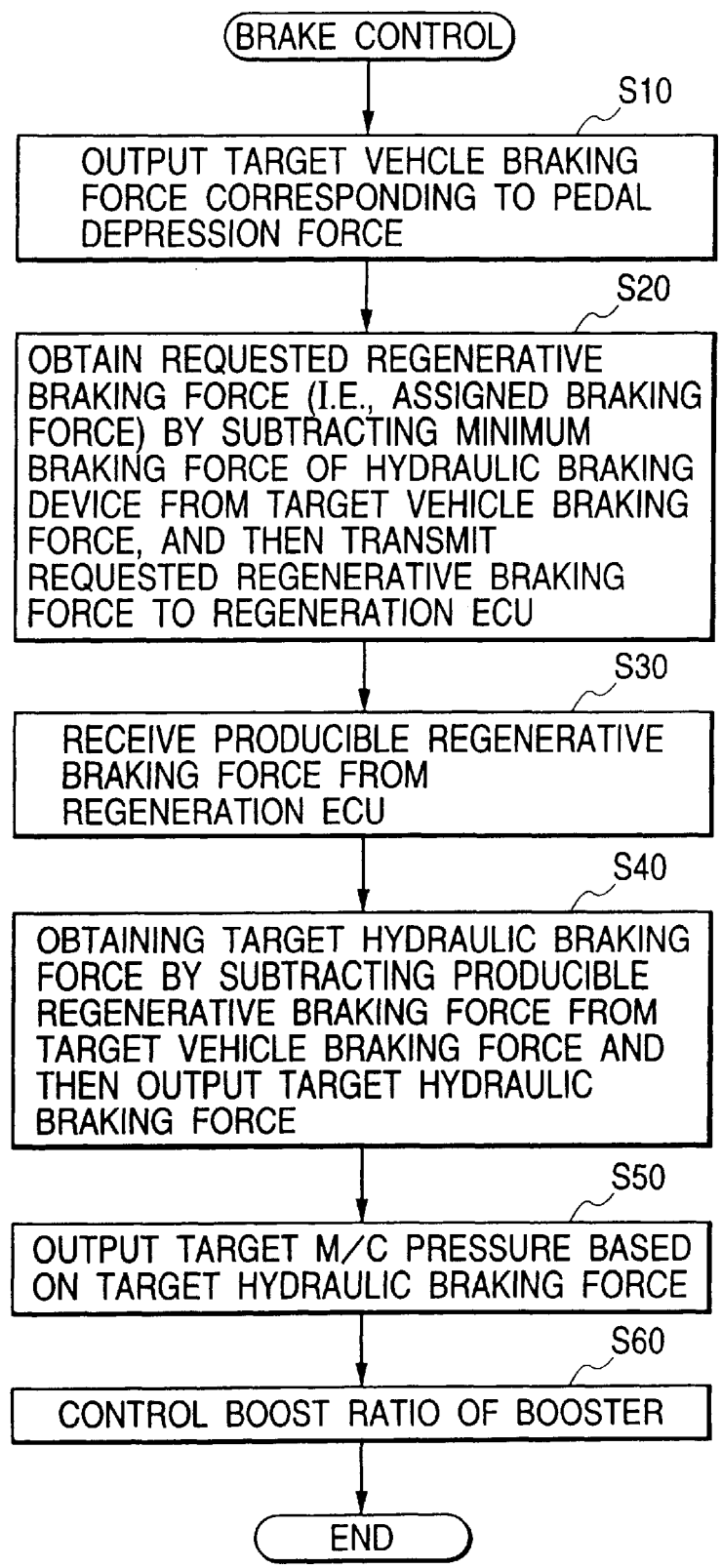
FIG. 6 is a flowchart showing a brake control in accordance with the first embodiment of the present invention.

Next, an operation of the hybrid vehicle during the brake pedal operation in accordance with the first embodiment of the present invention will be explained with reference to FIG. 6. FIG. 6 is a flowchart showing a brake control repetitively performed by the brake ECU 40 in response to a depression of the brake pedal BP. According to the hybrid vehicle in accordance with the first embodiment of the present invention, when the driver depresses the brake pedal BP, the depression force sensor 41 outputs a pedal depression force, serving as a brake pedal input value, to the brake ECU 40. The brake ECU 40 obtains a target vehicle braking force corresponding to the pedal depression force with reference to a map or a table or an equation stored in a memory (refer to step S10). Next, an assigned braking force is obtained by subtracting a minimum braking force (later described) of a hydraulic braking device from the target vehicle braking force. The assigned braking force thus obtained is transmitted as a requested regenerative braking force to the regeneration ECU 10 (refer to step S20). The regeneration ECU 10 causes the motor ECU 20 to perform a regeneration control based on the requested regenerative braking force. An actual regenerative braking force produced by the motor 70 is detected. The detected actual regenerative braking force is returned as a producible regenerative braking force to the brake ECU 40. The brake ECU 40 receives the producible regenerative braking force sent from the regeneration ECU 10 (refer to step S30). The brake ECU 40 obtains a target braking force of the hydraulic braking device (i.e., a target hydraulic braking force) which is obtained by subtracting the producible regenerative braking force from the target vehicle braking force (refer to step S40). In other words, the target hydraulic braking force is equal to a sum of the minimum braking force and a distributive braking force. The distributive braking force is equal to a difference between the requested regenerative braking force and the producible regenerative braking force. Then, a target M/C pressure corresponding to the target hydraulic braking force is obtained based on a map or a table or an equation stored in the memory (refer to step S50). The boost ratio of vacuum booster 50 is controlled by switching the reaction force adjusting solenoid valve 67 in such a manner that the actual M/C pressure (i.e., the pressure in the front M/C chamber 51a) is equalized to the target M/C pressure (refer to step S60). More specifically, the boost ratio control is performed in the following manner. The M/C pressure is equal to the W/C pressure during an ordinary braking operation (e.g., an ABS non-operating condition). Thus, an oil pressure detected by a hydraulic sensor provided somewhere in a path connecting the front M/C chamber 51a to each W/C is compared with the target M/C pressure to obtain a difference. A feedback control is performed to eliminate this difference.

Next, an operation of the vacuum booster 50 in the boost ratio control will be explained. The following description includes a first reaction force mode and a second reaction force mode for the reaction force adjusting solenoid valve 67. In the first reaction force mode, the reaction force adjusting solenoid valve 67 connects the reaction force adjusting chamber 66 to the low-pressure source $R_{LP}$ (refer to FIGS. 2 to 4). In the second reaction force mode, the reaction force adjusting solenoid valve 67 connects the reaction force adjusting chamber 66 to the high-pressure source $R_{HP}$ (refer to FIG. 5).

Based on the first reaction force mode, three states of an initial/depressurizing state, a pressurizing state, and a holding state will be explained hereinafter.

FIG. 2 shows the initial/depressurizing state where the brake pedal BP is not depressed or the brake pedal is returning to the initial (i.e., home) position. In this initial/depressurizing state, the M/C piston 54 is resiliently urged rearward by the return spring 55. The front M/C chamber 51a communicates with the reservoir 52. The pressure regulating valve 57 is positioned at an initial position where the first port 56a is connected to the third port 56c while the second port 56b is isolated. Thus, the front booster chamber 50a and the rear booster chamber 50b are maintained at the low pressure of the low-pressure source $R_{LP}$. None of the hydraulic braking force and the regenerative braking force are available in this condition.

Figure 3:
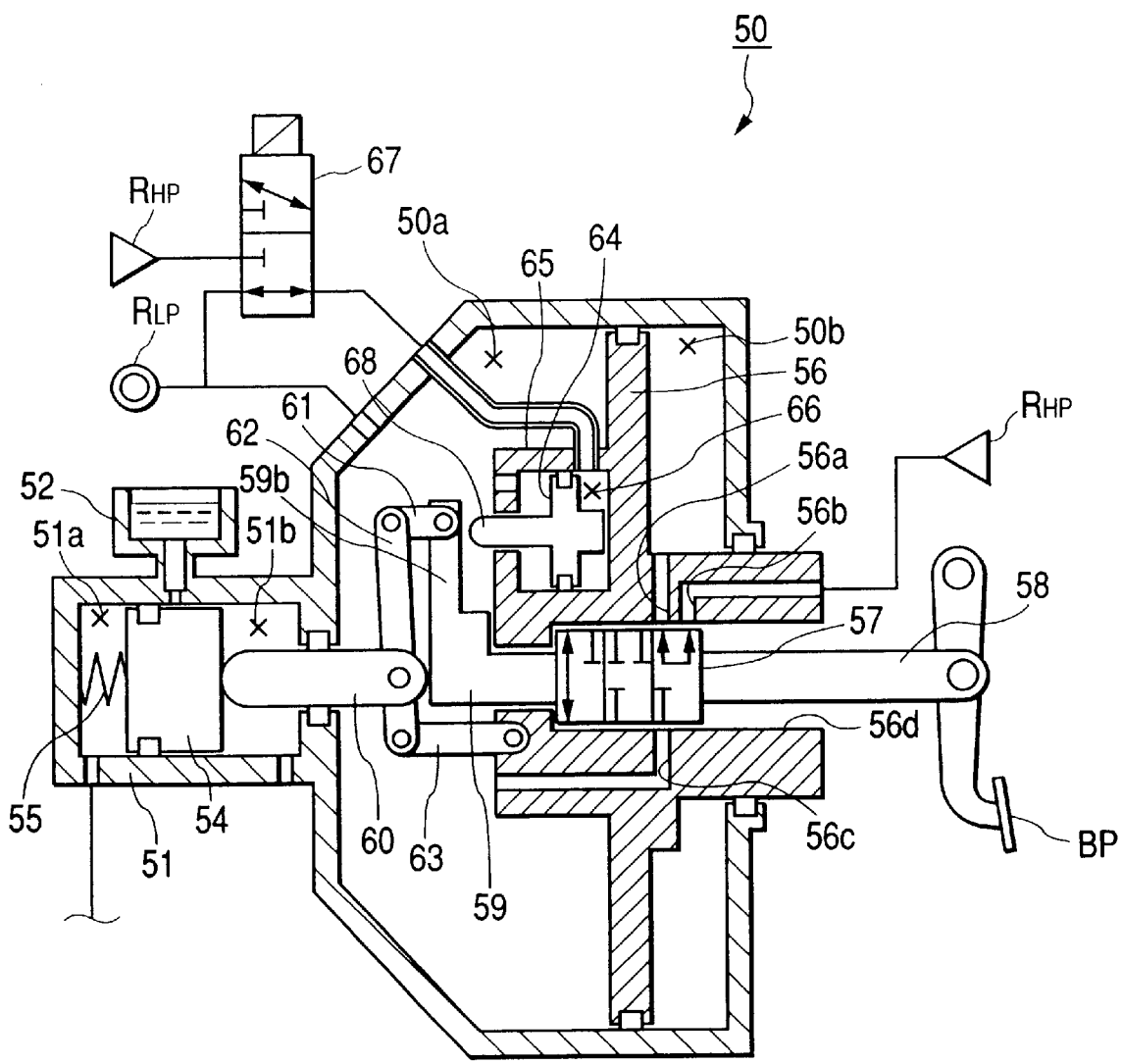
FIG. 3 is a diagram showing a pressurizing state of the hydraulic circuit arrangement in accordance with the first and third embodiments of the present invention.

FIG. 3 shows the pressurizing state where the brake pedal BP is depressed more than a predetermined amount prior to the holding state. In this pressurizing state, the pressure regulating valve 57 is positioned at a pressure-increasing position where the first port 56a is connected to the second port 56b while the third port 56c is isolated. The high-pressure source $R_{HP}$ is connected to the rear booster chamber 50b. The front booster chamber 50a is isolated from the rear booster chamber 50b. The power piston 56 moves forward by a pressure difference between the high-pressure source $R_{HP}$ and the low-pressure source $R_{LP}$. The power piston 56, when moving forward, pushes the M/C piston 54 vial the booster output shaft 60. The front M/C chamber 51a is isolated from the reservoir 52. Thus, the inside pressure of front M/C chamber 51a (i.e., M/C pressure) increases. The increased M/C pressure is transmitted to the W/C of each wheel. As a result, the hydraulic braking force is available.

Figure 4:
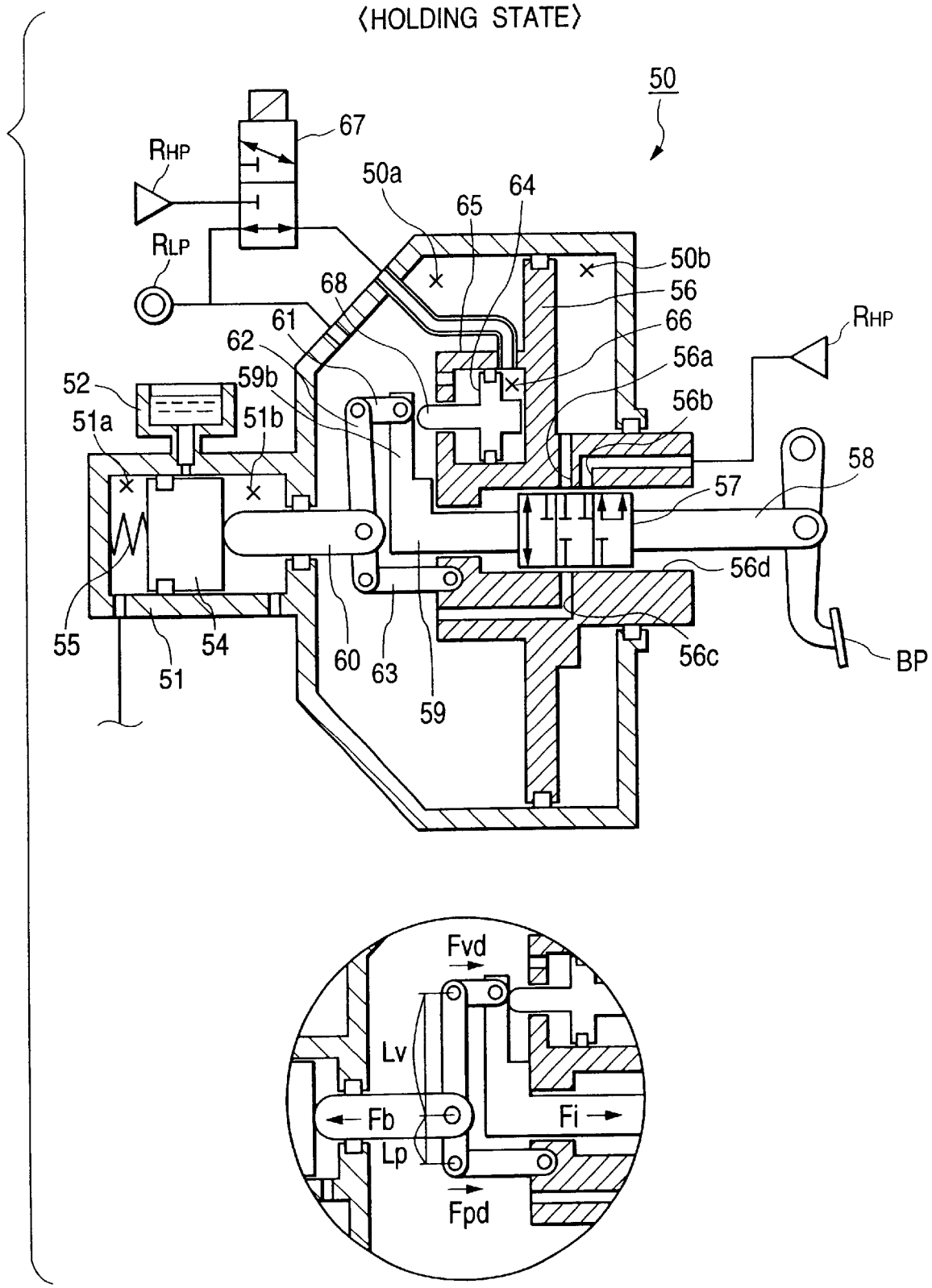
FIG. 4 is a diagram showing a holding state of the hydraulic circuit arrangement in accordance with the first and third embodiments of the present invention.

FIG. 4 shows the holding state where the brake pedal BP is held in a depressed condition. When the brake pedal BP is held in the depressed condition, a reaction force of the booster output is separated into a reaction force of the power piston and a reaction force of the valve plunger. The pedal input shaft 58 is pushed back by the reaction force of the valve plunger. The pressure regulating valve 57 is thus shifted to a holding position where the first port 56a, the second port 56b and the third port 56c are isolated from each other. The pressure regulating valve 57 is balanced at this holding position. In this condition, the reaction force of the pedal input shaft is equal to the reaction force of the valve plunger. It is now assumed that Fb represents a booster output, Fpd represents the reaction force of the power piston, Fvd represents the reaction force of the valve plunger, Lp represents the length of a power piston side of the second lever 62, Lv represents the length of a valve plunger side of the second lever 62, and Fi represents the reaction force of the pedal input shaft. The following equations ① to ③ are established to determine the relationship between the booster output and the reaction force of the input shaft. More specifically, in the first reaction force mode, the boost ratio (Fb/Fi) is substantially determined by Lv and Lp which depend on the mechanical arrangement. Accordingly, the boost ratio thus obtained is referred to as "mechanically determined boost ratio." Furthermore, the hydraulic braking force obtained by this boost ratio is referred to as "minimum braking force of hydraulic braking device" which is set to be not smaller than a minimum vehicle braking force required according to law regulations.

$$Fb = Fpd + Fvd \quad ①$$

$$Fpd * Lp = Fvd * Lv \quad ②$$

$$Fi = Fvd \quad ③$$
$$= Fb/(Lv/Lp + 1)$$

Next, the second reaction force mode will be explained based on the holding state. As shown in FIG. 5, in the holding state, the reaction force adjusting solenoid valve 67 connects the reaction force adjusting chamber 66 to the high-pressure source $R_{HP}$. For example, air is introduced into the reaction force adjusting chamber 66. The pressure of the reaction force adjusting chamber 66 increases. The increased pressure acts on the reaction force adjusting piston 64. The reaction force adjusting plunger 68 pushes the valve plunger 59 forward so as to bring it into a balanced condition. This balanced condition establishes the following relationship, in which Pc represents a pressure difference between the reaction force adjusting chamber 66 and the front booster chamber 50a and Ac represents an area of the reaction force adjusting piston 64. Accordingly, when required to obtain the same booster output, the reaction force of the input shaft becomes small in the second reaction force mode compared with the first reaction force mode. In the second reaction force mode, the booster ratio is substantially determined by the pressure of the reaction force adjusting chamber 66.

$$Fi = Fvd - (Pc \times Ac)$$
$$= Fb/(Lv/Lp + 1) - (Pc \times Ac)$$

The above equations ① and ② are established in the second reaction force mode, too. Thus, the pressure of the rear booster chamber 50b increases by an amount required for resisting against the returning load acting on the power piston 56 when the pressure acts on the reaction force adjusting piston 64. Similarly, the boost ratio increases when the second reaction force mode is employed in the pressurizing state or in the depressurizing state.

Returning to a step S60 in the flowchart shown in FIG. 6, the boost ratio control of the booster is performed in the following manner. In the boost ratio control of the booster, the brake ECU 40 is set to the first reaction force mode when the target M/C pressure corresponding to a pedal depression force is equal to a M/C pressure corresponding to the minimum braking force of the hydraulic braking device, i.e., when the requested regenerative braking force (=assigned braking force) is identical with the producible regenerative braking force. In this case, the M/C pressure is obtained in accordance with the mechanically determined boost ratio. Thus, the hydraulic braking device produces the minimum braking force. On the other hand, the target M/C pressure corresponding to a pedal depression force may exceed the M/C pressure corresponding to the minimum braking force of the hydraulic braking device. In other words, the requested regenerative braking force (=assigned braking force) may be larger than the producible regenerative braking force. In such a case, the brake ECU 40 adequately selects the first reaction force mode or the second reaction force mode, i.e., adequately switches the reaction force adjusting solenoid valve 67, to feedback controls the actual M/C pressure to the target M/C pressure. With this feedback control, the boost ratio exceeds the mechanically determined boost ratio. Thus, the M/C pressure is obtained in accordance with this boost ratio and the target hydraulic braking force is attained.

Figure 7:
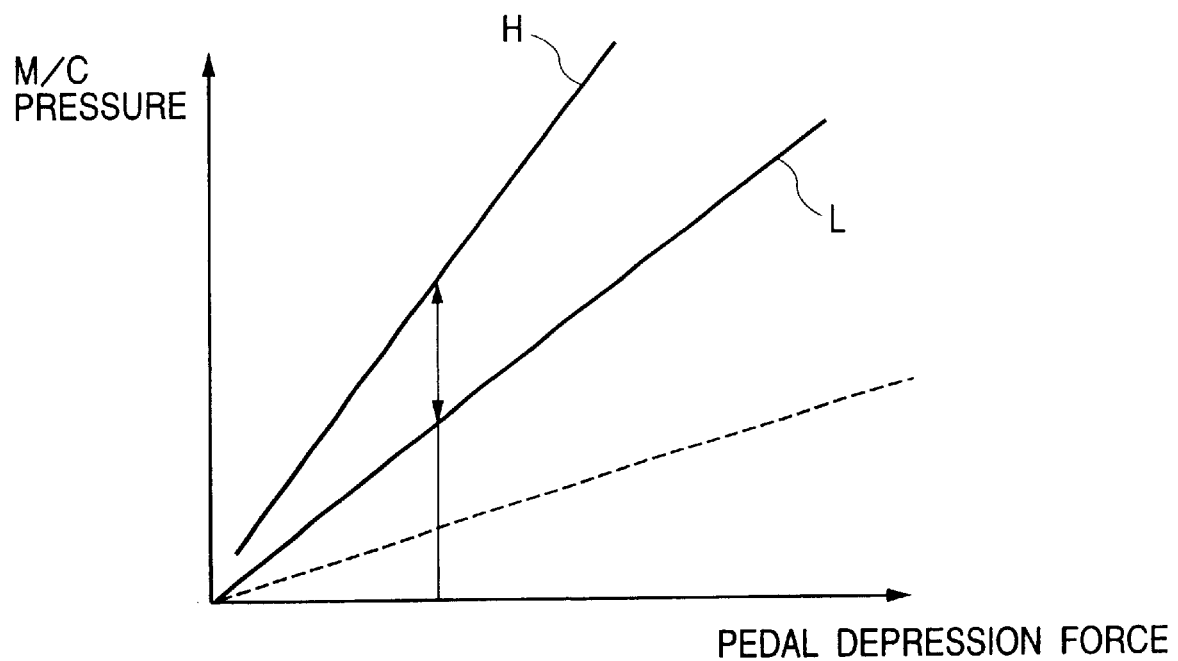
FIG. 7 is a graph showing the relationship between the pedal depression force and the M/C pressure in accordance with the first through fourth embodiments of the present invention.

FIG. 7 is a graph showing the relationship between the pedal depression force and the M/C pressure. In the graph, a straight line L represents the characteristics of the first reaction force mode which is determined beforehand in accordance with the minimum braking force of the hydraulic braking device. A straight line H represents the characteristics of the second reaction force mode which is for example determined in accordance with the target vehicle braking force. In the boost ratio control of the booster, when the target M/C pressure corresponding to a pedal depression force is equal to the M/C pressure corresponding to the minimum braking force of the hydraulic braking device, the M/C pressure can be plotted as a point on the straight line L corresponding to the pedal depression force. On the other hand, when the target M/C pressure corresponding to a pedal depression force exceeds the M/C pressure corresponding to the minimum braking force of the hydraulic braking device, the M/C pressure can be plotted as a point in a region between the straight line L and the straight line H. In the graph of FIG. 7, a dotted line represents the characteristics in case of the booster failure in which a pressure difference between the high-pressure source $R_{HP}$ and the low-pressure source $R_{LP}$ becomes 0. The boost ratio can be defined as a ratio of the M/C pressure in a normal booster to the M/C pressure in a failed booster.

Figure 8:
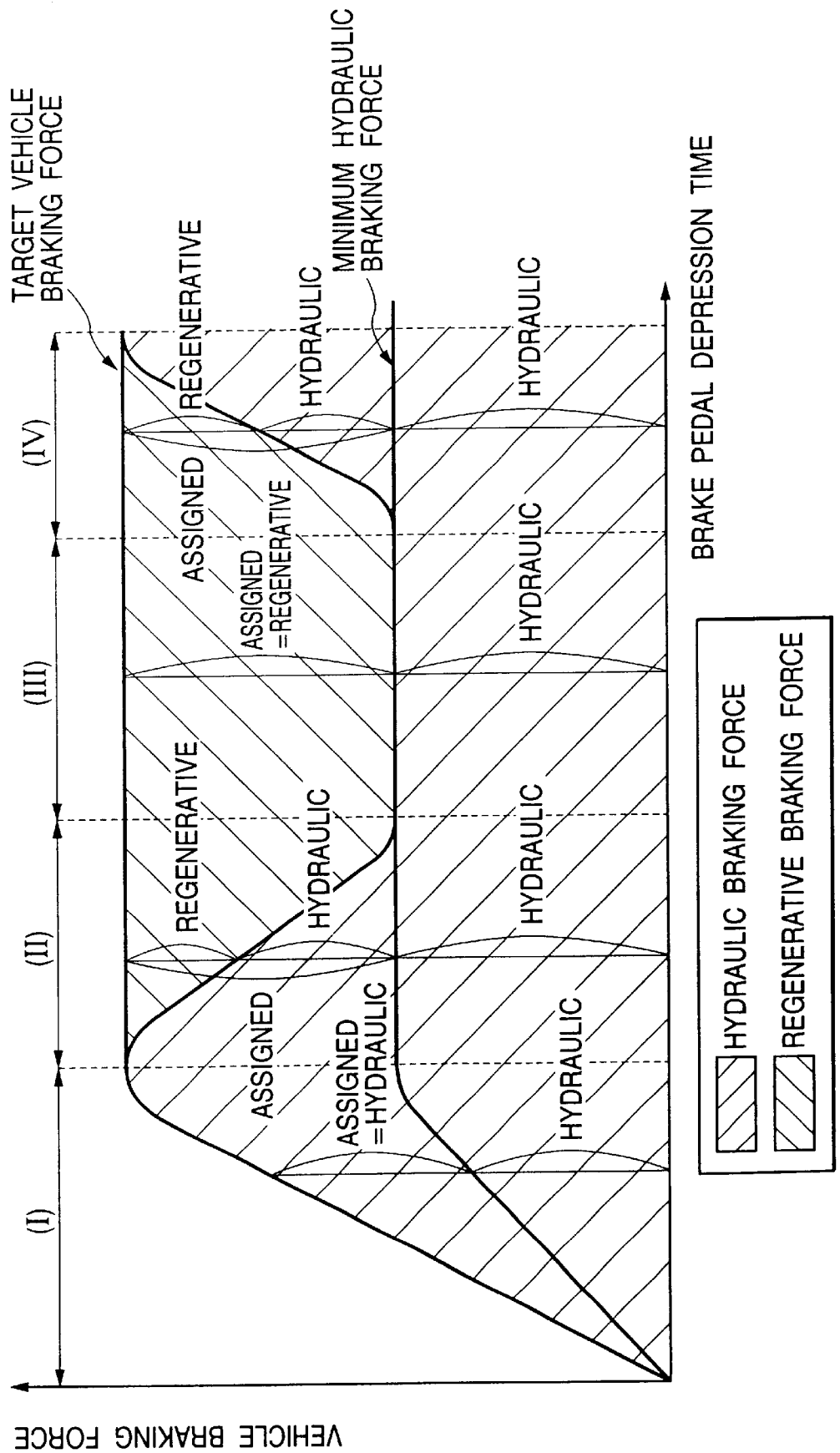
FIG. 8 is a graph showing the relationship between the pedal depression time and the vehicle braking force in accordance with the first through fourth embodiments of the present invention.

FIG. 8 is a graph showing the relationship between the depression time of the brake pedal BP and the vehicle braking force. This graph is drawn based on the following assumption. In the beginning of the depression of the brake pedal BP, the battery 90 is fully charged and therefore no regenerative braking force is produced. Thereafter, due to some amount of discharging, the battery 90 comes to a condition that the regenerative braking force is producible. Then, the battery 90 is again fully charged and no generative force is producible.

In the graph of FIG. 8, no generative braking force is available in the beginning of the depression of the brake pedal BP (refer to phase I). Thus, all of the assigned braking force (=requested regenerative braking force) is produced by the hydraulic braking device. The boost ratio of the booster is controlled so as to obtain the target vehicle braking force which is a sum of the minimum braking force of the hydraulic braking device and the assigned braking force. In this case, the boost ratio of the booster agrees with the straight line H shown in FIG. 7. Thereafter, due to some amount of discharging, the battery 90 comes to a condition that the regenerative braking force is producible. The producible regenerative braking force gradually increases (refer to phase II). The distributive braking force is obtained by subtracting the producible regenerative braking force from the assigned braking force. The boost ratio of the booster is controlled so as to obtain a sum of the distributive braking force thus obtained and the minimum braking force. In this case, the boost ratio of the booster varies in the range between the straight line H and the straight line L shown in FIG. 7. Furthermore, when the producible regenerative braking force is maximized (refer to phase III), all of the assigned braking force is supplied from the regenerative braking device. Accordingly, the boost ratio of the booster is controlled so as to cause the hydraulic braking device to produce the minimum braking force. In this case, the boost ratio of the booster agrees with the straight line L shown in FIG. 7. Thereafter, the producible regenerative braking force gradually decreases (refer to phase IV). The distributive braking force is obtained by subtracting the producible regenerative braking force from the assigned braking force. The boost ratio of the booster is controlled so as to obtain a sum of the distributive braking force thus obtained and the minimum braking force. In this case, the boost ratio of the booster varies in the range between the straight line H and the straight line L shown in FIG. 7.

The depression force sensor 41 of the first embodiment serves as input value detecting means of the present invention. The brake ECU 40 serves as target vehicle braking force output means, assigned braking force output means, and brake control means of the present invention. In the flowchart of FIG. 6, the step S10 represents the processing performed by the target vehicle braking force output means, the step S20 represents the processing of the assigned braking force output means, and steps S40 to S60 represent the processing of the brake control means.

As described above, the first embodiment has the following effects.

①The hydraulic braking device always operates to attain the target vehicle braking force. Thus, it becomes possible to realize the cooperative control without using a conventional cooperative control valve which selectively actuates or deactivates the hydraulic braking device. The hydraulic circuit arrangement can be simplified.

②When the producible regenerative braking force is not smaller than the assigned braking force (i.e., requested regenerative braking force), all of the assigned braking force is supplied from the regenerative braking device. When the producible regenerative braking force is smaller than the assigned braking force, the hydraulic braking force is added as a supplement for filling a lack of braking force. In other words, the assigned braking force is supplied from the regenerative braking device as much as possible. This is effective to suppress the abrasion of the brake pad or the brake shoe used in the hydraulic braking device. The regeneration efficiency can be increased.

③The vacuum booster 50 forcibly changes the reaction force of the pedal input shaft to adjust the boost ratio. Thus, it becomes possible to provide a relatively simple arrangement for adjusting the boost ratio.

Figure 24:
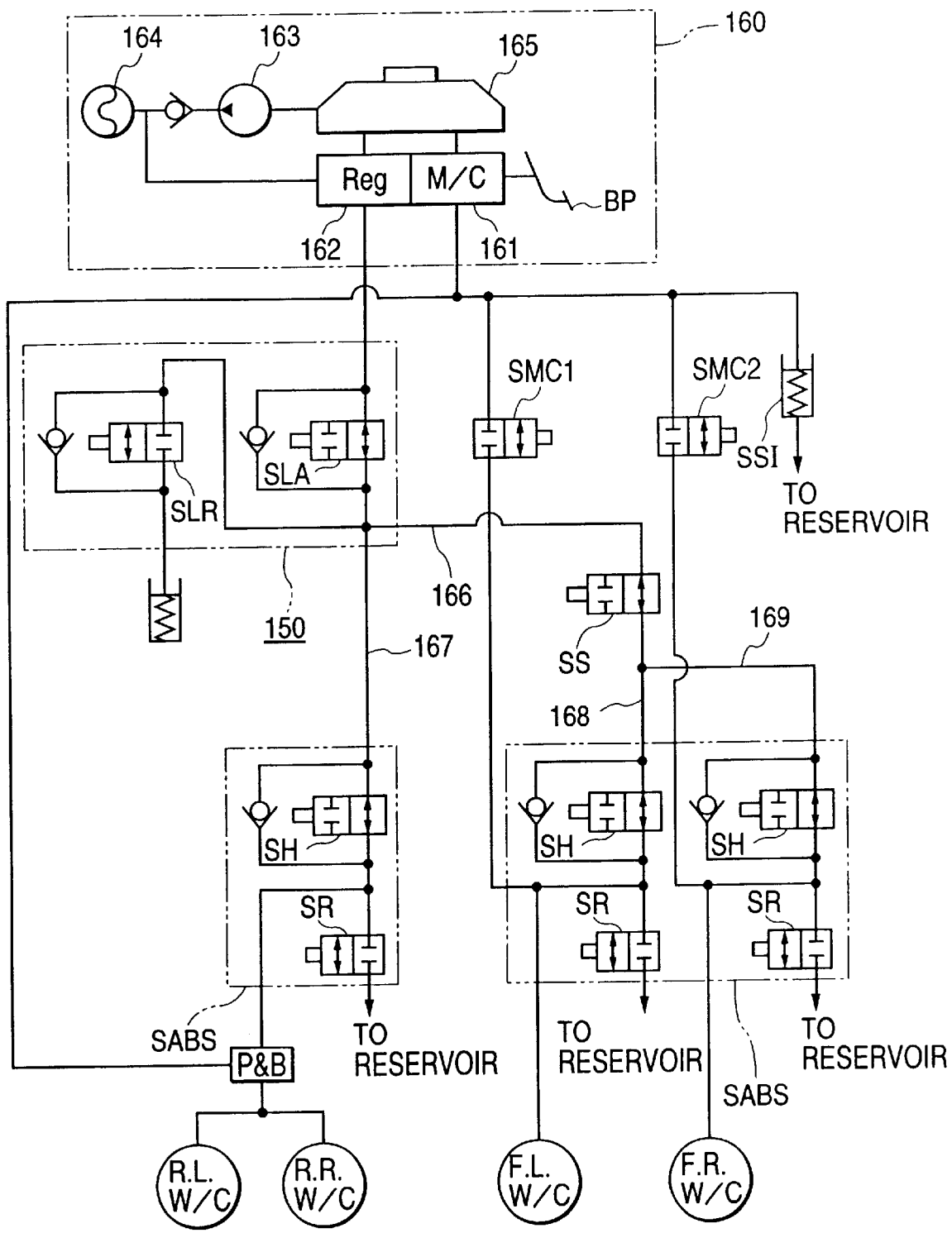
FIG. 24 is a hydraulic circuit arrangement of the conventional hybrid vehicle.

④The hydraulic braking device includes the vacuum booster 50 at the upstream side of the M/C 51. The vacuum booster 50 is equipped with the boost ratio adjusting mechanism. Thus, it is possible to employ a hydraulic circuit arrangement in which the M/C pressure agrees with the W/C pressure during an ordinary braking operation. In other words, the present invention does not require a conventional fail-safe mechanism (i.e., valves SMC1 and SMC2 and associated oil supply passage extending from M/C 161 to corresponding W/C shown in FIG. 24). The circuit arrangement of the hydraulic braking device can be simplified.

Second Embodiment

The second embodiment differs from the first embodiment in that the vacuum booster 50 is replaced by a hydro booster 250. Therefore, components identical with those disclosed in the first embodiment are denoted by same reference numerals. The explanation for these components is omitted in the following explanation.

Figure 9:
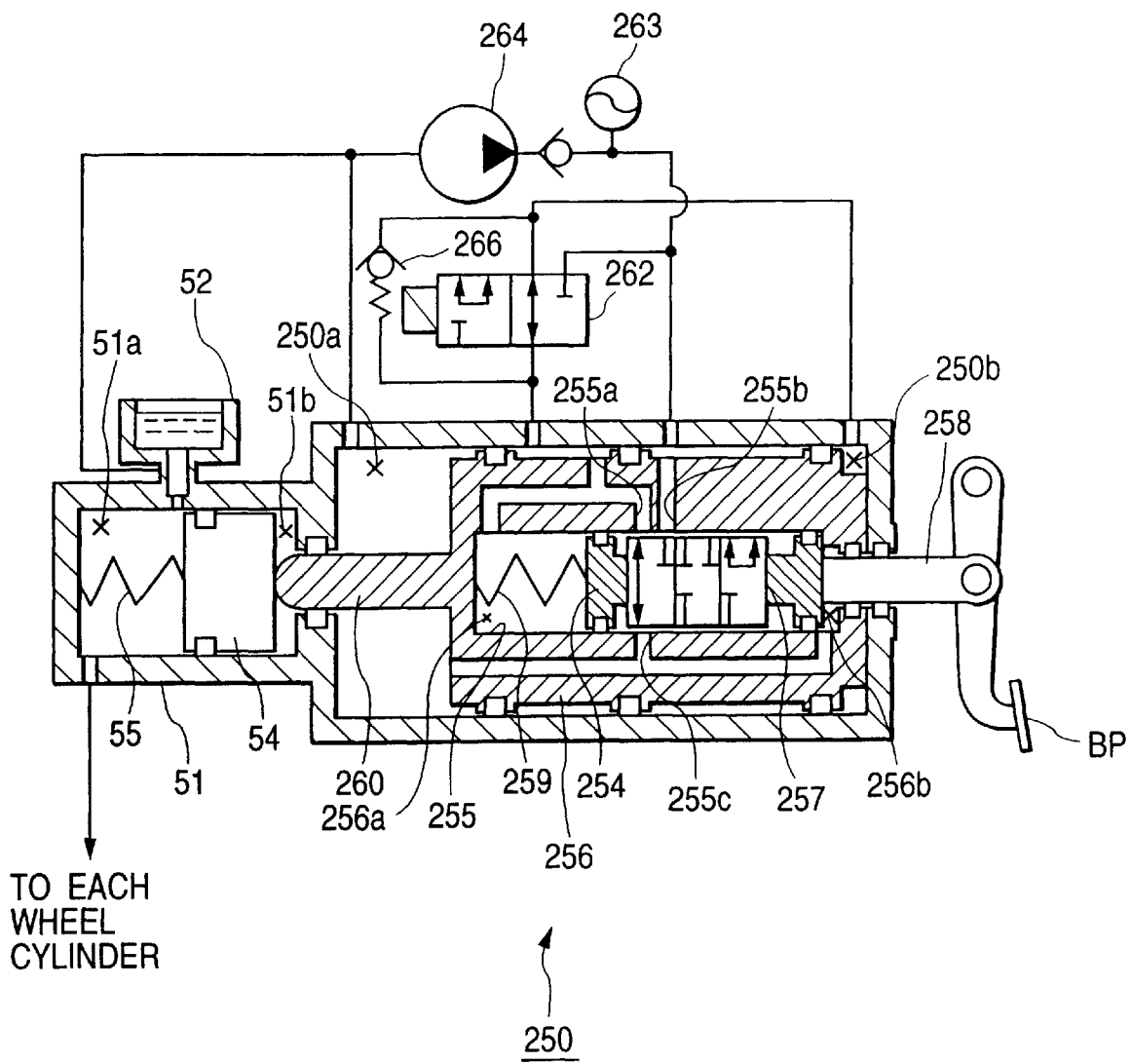
FIG. 9 is a diagram showing an initial/depressurizing state of a hydraulic circuit arrangement in accordance with second and fourth embodiments of the present invention.

The hydro booster 250 will be explained in more detail with reference to FIG. 9. FIG. 9 shows a hydraulic circuit arrangement in accordance with the second embodiment of the present invention. The hydro booster 250 is provided at the upstream side of M/C 51. The hydro booster 250 comprises a built-in power piston 256. The power piston 256 is accommodated in an inside space of the hydro booster 250 so as to be hermetically slidable in an axial direction of the hydro booster 250. The power piston 256 partitions the inside space of the hydro booster 250 into a front booster chamber 250a and a rear booster chamber 250b. The front booster chamber 250a always communicates with a reservoir 52 serving as a low-pressure source.

The power piston 256 comprises a reaction force piston 254 which is accommodated in a bore 255 and is slidable in the axial direction. A pressure regulating valve 257 is integrally formed with the reaction force piston 254. The inside space of the bore 255 is separated into a front bore chamber 256a and a rear bore chamber 256b by the reaction force piston 254. A rear end of the reaction force piston 254 is connected to a pedal input shaft 258. The brake pedal BP is swingably supported by the rear end of the pedal input shaft 258. A spring 259 is provided at the front side of the reaction force piston 254. A booster output shaft 260 is integrally formed with the power piston 256 and extends forward from the power piston 256. The booster output shaft 260 is hermetically slidable in an axial direction in a through hole connecting the front booster chamber 250a to a rear M/C chamber 51b. By the resilient force of a return spring 55, a M/C piston 54 is always brought into contact with the booster output shaft 260.

A first port 255a, a second port 255b, and a third port 255c are provided on an inside wall of the bore 255. The first port 255a always communicates with the front bore chamber 256a. A boost ratio adjusting solenoid valve 262 selectively connects or disconnects the first port 255a to or from the rear booster chamber 250b. When the first port 255a is disconnected from the rear booster chamber 250b, a pressure difference between the first port 255a and the rear booster chamber 250b is limited within a predetermined value by a differential pressure regulating valve 266. The brake ECU 40 controls a valve opening pressure of the differential pressure regulating valve 266. The second port 255b always communicates with an accumulator 263 which stores a pressurized brake fluid. Furthermore, the third port 255c always communicates with both of the front booster chamber 250a and the rear bore chamber 256b. A hydraulic pump 264 pressurizes a brake fluid of the reservoir 52 and supplies the pressurized brake fluid to the accumulator 263.

The second embodiment is similar to the first embodiment in an operation of the hybrid vehicle during a brake pedal operation. Namely, the brake control of the hybrid vehicle is performed in accordance with the flowchart shown in FIG. 6, although the boost ratio control in the step S60 is performed by the hydro booster 250.

Next, an operation of the hydro booster 250 during a brake operation will be explained. The following description includes a first output mode and a second output mode for the boost ratio adjusting solenoid valve 262. In the first output mode, the boost ratio adjusting solenoid valve 262 connects the rear boost chamber 250b to the first port 255a and the front bore chamber 256a (refer to FIGS. 9 to 11). In the second output mode, the boost ratio adjusting solenoid valve 262 connects the rear booster chamber 250b to the accumulator 263 (refer to FIG. 12).

Based on the first output mode, three states of an initial/depressurizing state, a pressurizing state, and a holding state will be explained hereinafter. FIG. 9 shows the initial/depressurizing state where the brake pedal BP is not depressed or the brake pedal is returning to the initial (i.e., home) position. In this initial/depressurizing state, the M/C piston 54 is resiliently urged rearward by the return spring 55. The front M/C chamber 51a communicates with the reservoir 52. The pressure regulating valve 257 is positioned at an initial position where the first port 255a is connected to the third port 255c while the second port 2556b is isolated. Thus, the front booster chamber 250a and the rear booster chamber 250b are maintained at the low pressure of the reservoir 52. None of the hydraulic braking force and the regenerative braking force are available in this condition.

Figure 10:
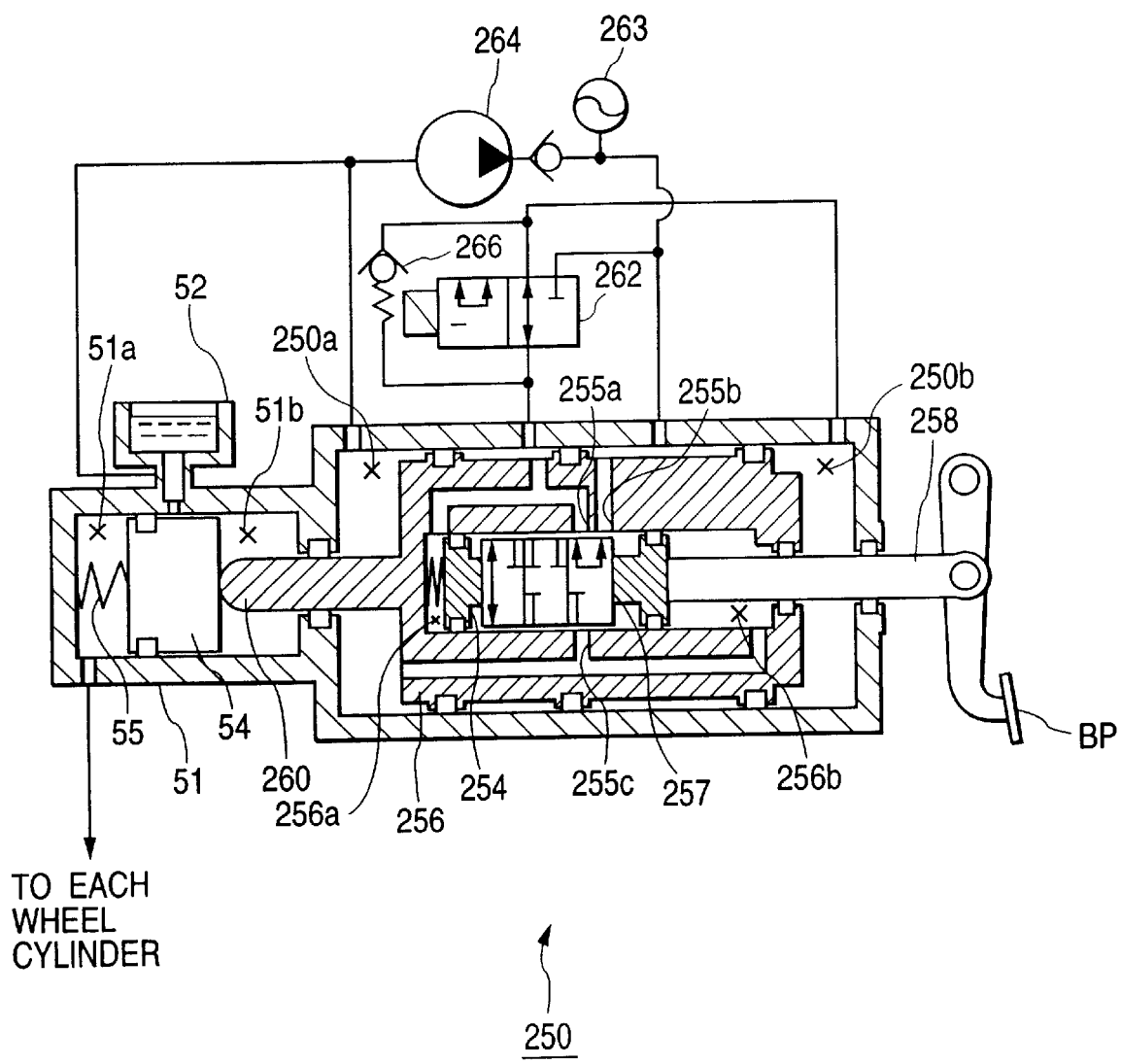
FIG. 10 is a diagram showing a pressurizing state of the hydraulic circuit arrangement in accordance with the second and fourth embodiments of the present invention.

FIG. 10 shows the pressurizing state where the brake pedal BP is depressed more than a predetermined amount prior to the holding state. In this pressurizing state, the pressure regulating valve 257 is positioned at a pressure-increasing position where the first port 255a is connected to the second port 255b while the third port 255c is isolated. The accumulator 263, serving as the high-pressure source, is connected to the rear booster chamber 250b. The front booster chamber 250a is isolated from the rear booster chamber 250b. The power piston 256 moves forward by a pressure difference between the front booster chamber 250a and the rear booster chamber 250b. The power piston 256, when moving forward, pushes the M/C piston 54 vial the booster output shaft 260. The front M/C chamber 51a is isolated from the reservoir 52. Thus, the inside pressure of front M/C chamber 51a (i.e., M/C pressure) increases. The increased M/C pressure is transmitted to the W/C of each wheel. As a result, the hydraulic braking force is available.

Figure 11:
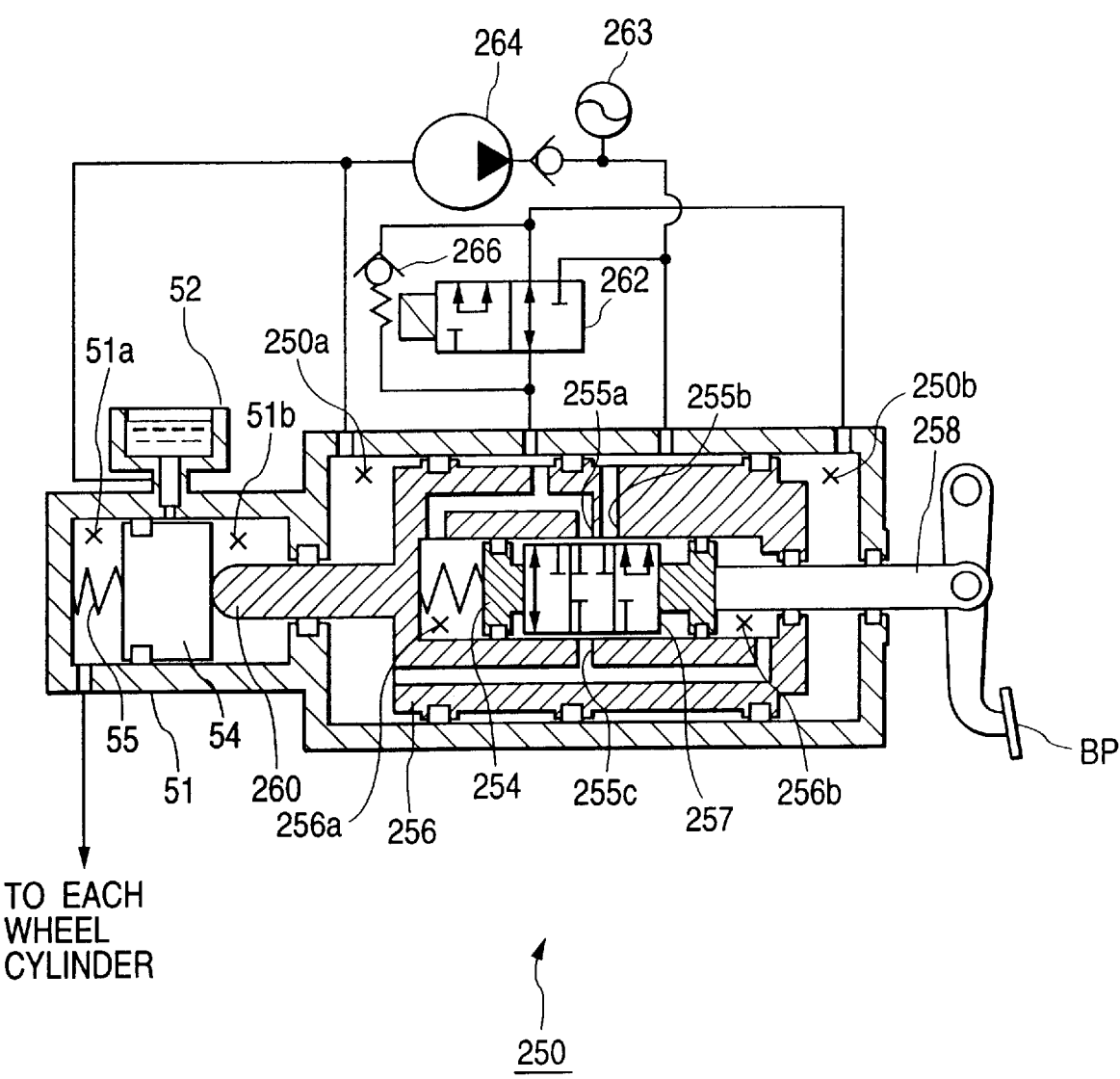
FIG. 11 is a diagram showing a holding state of the hydraulic circuit arrangement in accordance with the second and fourth embodiments of the present invention.

FIG. 11 shows the holding state where the brake pedal BP is held in a depressed condition. When the brake pedal BP is held in the depressed condition, the pedal input shaft 258 is pushed back by a reaction force which is produced when the pressure of the front bore chamber 256a (i.e., regulator pressure) acts on the reaction force piston 254. The pressure regulating valve 257 is thus shifted to a holding position where the first port 255a, the second port 255b and the third port 255c are isolated from each other. The pressure regulating valve 257 is balanced at this holding position. It is now assumed that Fb represents a booster output, Fi represents the reaction force of the pedal input shaft, Ap represents an area of the power piston, Ar represents an area of the reaction force piston, Pr represents the regulator pressure, and Pp represents the pressure of the rear booster chamber 250b. The following equations are established to determine the relationship between the booster output and the reaction force of the pedal input shaft. More specifically, in the first output mode, the boost ratio (Fb/Fi) is substantially determined by Ap and Ar which depend on the mechanical arrangement. Accordingly, the boost ratio thus obtained is referred to as "mechanically determined boost ratio." Furthermore, the hydraulic braking force obtained by this boost ratio is referred to as "minimum braking force of hydraulic braking device" which is set to be not smaller than a minimum vehicle braking force required according to law regulations.

$$Fb = Pp \times Ap$$
$$= Pr \times Ap$$

$$Fi = Pr \times Ar$$
$$Fb = Fi \times Ap/Ar$$

Figure 12:
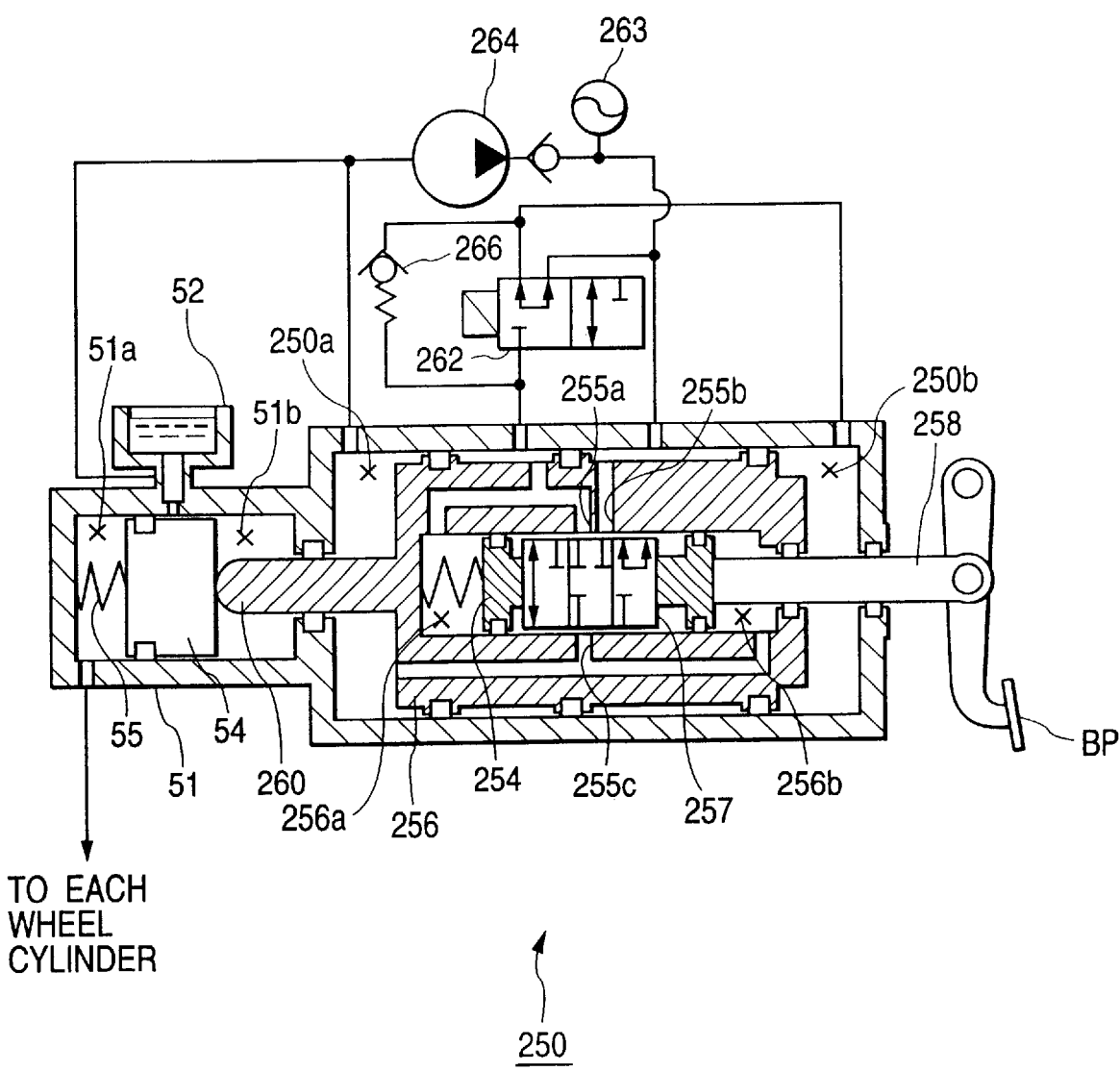
FIG. 12 is a diagram showing a boost ratio increasing state of the hydraulic circuit arrangement in accordance with the second and fourth embodiments of the present invention.

Next, the second output mode will be explained based on the holding state. As shown in FIG. 12, in the holding state, the boost ratio adjusting solenoid valve 262 connects the rear booster chamber 250*b* to the accumulator 263. The pressure of the rear booster chamber 250*b* increases. The pressure of the rear booster chamber 250*b* is suppressed by the differential pressure regulating valve 266. The valve opening pressure of the differential pressure regulating valve 266 restricts a pressure difference between the rear booster chamber 250*b* and the regulator pressure to a predetermined value. When the pressure of the rear booster chamber 250*b* increases, the power piston 256 is pushed forward by the increased pressure and brought into a balanced condition. This balanced condition establishes the following relationship, in which Pd represents the valve opening pressure of the differential pressure regulating valve 266. The booster output obtained in response to the same reaction force of the pedal input shaft becomes large in the second output mode compared with the first output mode. In the second reaction force mode, the booster ratio is substantially determined by the valve opening pressure of the differential pressure regulating valve 266. Similarly, the boost ratio increases when the second output mode is employed in the pressurizing state or in the pressurizing state.

$$Fb = Pp \times Ap$$
$$= (Pr + Pd) \times Ap$$

$$Fi = Pr \times Ar$$
$$Fb = Fi \times Ap/Ar + Pd \times Ap$$

According to the second embodiment, in the step S60 of the flowchart shown in FIG. 6, the boost ratio control of the booster is performed in the following manner. In the boost ratio control of the booster, the brake ECU 40 is set to the first output mode when the target M/C pressure corresponding to a pedal depression force is equal to a M/C pressure corresponding to the minimum braking force of the hydraulic braking device, i.e., when the requested regenerative braking force (=assigned braking force) is identical with the producible regenerative braking force. In this case, the M/C pressure is obtained in accordance with the mechanically determined boost ratio. Thus, the hydraulic braking device produces the minimum braking force. On the other hand, the target M/C pressure corresponding to a pedal depression force may exceed the M/C pressure corresponding to the minimum braking force of the hydraulic braking device. In other words, the requested regenerative braking force (=assigned braking force) may be larger than the producible regenerative braking force. In such a case, the brake ECU 40 is set to the second output mode and the valve opening pressure of the differential pressure regulating valve 266 is adequately changed to equalize the actual M/C pressure to the target M/C pressure. With this control, the boost ratio exceeds the mechanically determined boost ratio. Thus, the M/C pressure is obtained in accordance with this boost ratio and the target hydraulic braking force is attained. In the control of the valve opening pressure of the differential pressure regulating valve 266, it is preferable to obtain a valve opening pressure corresponding to the target M/C pressure by using a map or a table or an equation which is stored beforehand in a memory. The feedback control is performed so as to equalize the valve opening pressure of the differential pressure regulating valve 266 with the obtained valve opening pressure.

The relationship between the pedal depression force and the M/C pressure is substantially identical with that of the first embodiment shown in the graph of FIG. 7. In the second embodiment, the straight line L represents the characteristics of the first output mode. The region between the straight line L and the straight line H represents the characteristics of the second output mode. According to the first output mode, the M/C pressure is substantially dependent on the mechanically determined boost ratio. The M/C pressure is thus determined in proportion to the pedal depression force (refer to the straight line L). According to the second output mode, the boost ratio changes in accordance with the valve opening pressure of the differential pressure regulating valve 266. Thus, the M/C pressure responsive to the pedal depression force varies in the region between the straight line L and the straight line H.

Furthermore, the relationship between the depression time of the brake pedal BP and the vehicle braking force is substantially identical with that of the first embodiment shown in the graph of FIG. 8. Therefore, the explanation of this relationship is omitted.

The above-described second embodiment brings substantially the same effects as those of the first embodiment.

The present invention should not be restricted to the above-described embodiments. Therefore, this invention may be embodied in several forms without departing from the technical scope thereof.

For example, in the first embodiment, the reaction force adjusting solenoid valve 67 may have a holding position for holding the pressure of reaction force adjusting chamber 66 (by isolating the reaction force adjusting chamber 66 from both of the low-pressure source $R_{LP}$ and the high-pressure source $R_{HP}$). Furthermore, in the second embodiment, it is possible to omit the differential pressure regulating valve 266 from the hydraulic circuit arrangement. In this case, the feedback control for equalizing the actual M/C pressure to the target M/C pressure is performed by controlling the valve position of the boost ratio adjusting solenoid valve 262.

Furthermore, using the boost ratio variable booster, such as the vacuum booster 50 or the hydro booster 250, disclosed in the above-described first and second embodiments makes it possible to realize so-called "variable jumping characteristics." In general, the relationship between a depression force applied on the brake pedal and an attained deceleration is as follows. When the depression force is small (i.e., when the depressing operation of the brake pedal is in a very beginning stage), the deceleration amount increases at a relatively small rate. On the other hand, when the depression force is large (e.g., when the depression amount of the brake pedal reaches a predetermined level), the deceleration amount increases at a relatively large rate. Accordingly, the M/C pressure abruptly increases (as if it jumps) when the depression amount of the brake pedal reaches the predetermined level. The M/C pressure at this moment is referred to as Pjump. Meanwhile, the brake stopping distance is dependent on a traveling speed of the vehicle. Even if the applied braking force is the same, the brake stopping distance of the vehicle varies according to its traveling speed. In view of the above, it is preferable that Pjump is set to a small value when the vehicle traveling speed is low and is set to a large value when the vehicle traveling speed is high. In this case, the M/C pressure can be differentiated in accordance with the vehicle traveling speed even when the same depression force is applied on the brake pedal. Thus, it becomes possible to obtain an appropriate braking force considering the vehicle traveling speed. As a result, it becomes possible to reduce a difference of the brake stopping distance between a high-speed traveling condition and a low-speed traveling condition. In this respect, the conventional vacuum booster uses a fixed value for Pjump. On the other hand, the boost ratio variable booster of the above-described embodiments can flexibly change the value of Pjump by changing the boost ratio. Thus, the boost ratio variable booster of the above-described embodiments can provide variable jumping characteristics. More specifically, it is possible to increase the boost ratio with increasing vehicle traveling speed. The value of Pjump increases when the vehicle traveling speed is large. Hence, it becomes possible to reduce a difference of the brake stopping distance between a high-speed traveling condition and a low-speed traveling condition.

Furthermore, using the above-described boost ratio variable booster makes it possible to realize a so-called buildup function for increasing the M/C pressure in accordance with the depression time of the bake pedal when a constant depression force is continuously applied on the brake pedal. The buildup function shortens the brake stopping distance.

Third Embodiment

A third embodiment is explained based on the same system arrangement and the same hydraulic circuit arrangement as those of the first embodiment. Namely, a vehicle braking apparatus of the third embodiment has a system arrangement shown in FIG. 1. A hydraulic circuit arrangement for the vehicle braking apparatus of the third embodiment is shown in FIG. 2. Therefore, the above-described detailed explanation of the first embodiment with reference to FIGS. 1 and 2 is equally applied to the system arrangement and the hydraulic circuit arrangement of the third embodiment.

Figure 13:
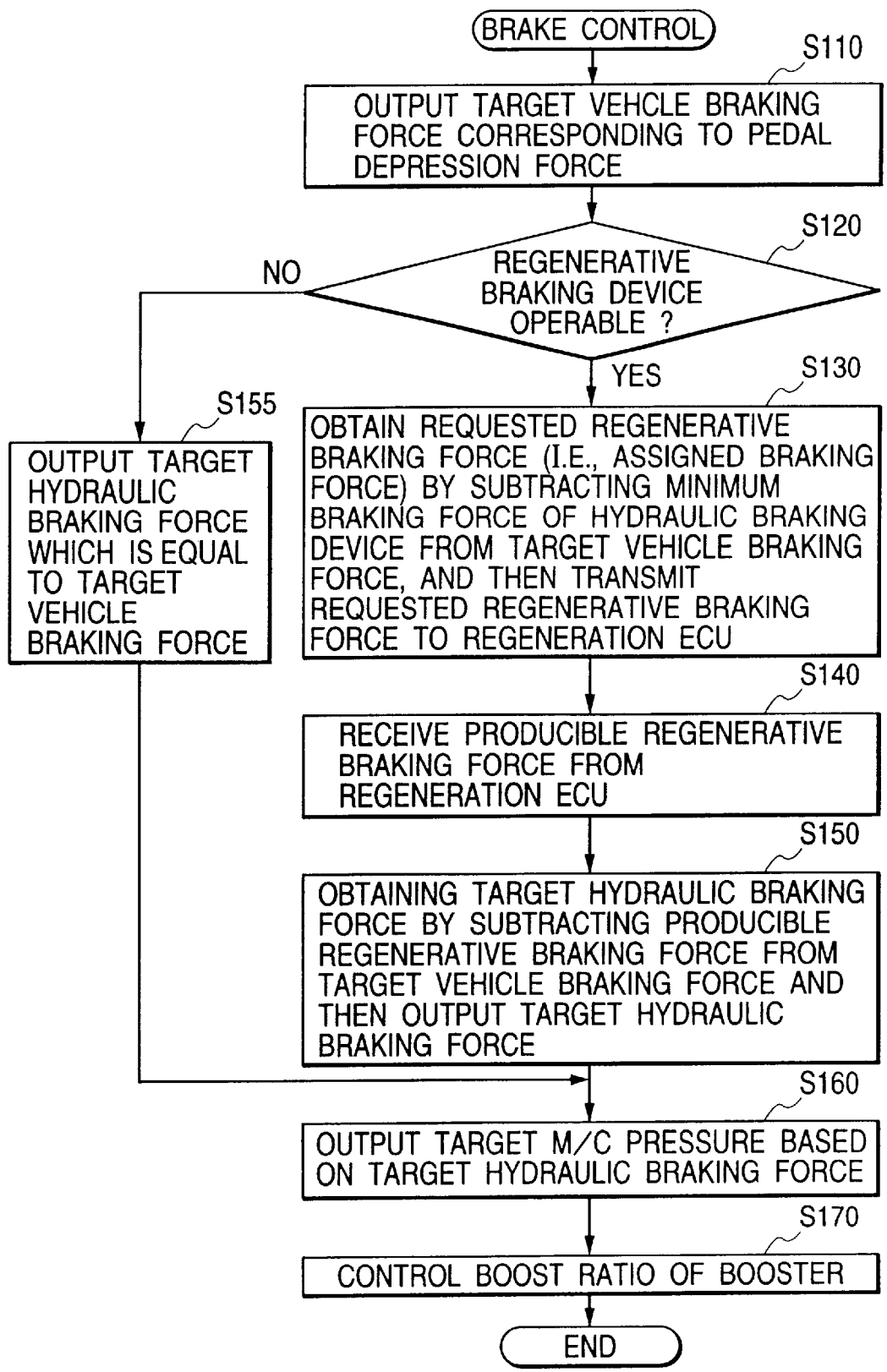
FIG. 13 is a flowchart showing a brake control in accordance with a third embodiment of the present invention.

Next, an operation of the hybrid vehicle during the brake pedal operation in accordance with the third embodiment of the present invention will be explained with reference to FIG. 13. FIG. 13 is a flowchart showing a brake control repetitively performed by the brake ECU 40 in response to a depression of the brake pedal BP. According to the hybrid vehicle in accordance with the third embodiment of the present invention, when the driver depresses the brake pedal BP, the depression force sensor 41 outputs a pedal depression force, serving as a brake pedal input value, to the brake ECU 40. The brake ECU 40 obtains a target vehicle braking force corresponding to the pedal depression force with reference to a map or a table or an equation stored in a memory (refer to step S110).

Next, the brake ECU 40 checks whether or not the regenerative braking device is operable (refer to step S120). More specifically, the brake ECU 40 requests the regeneration ECU 10 to collect information relating to the operation of the motor 70 as well as information relating to the charging condition of the battery 90. The regeneration ECU 10 inputs the information relating to the operation of the motor 70 from the motor ECU 20 and also inputs the information relating to the charging condition of the battery 90 from the battery ECU 30. The regeneration ECU 10 sends the collected information to the brake ECU 40. Based on the information relating to the operation of the motor 70, the brake ECU 40 makes a judgment as to whether the motor 70 can operate normally or whether input and output lines of the motor 70 are broken or short-circuited. Furthermore, based on the information relating to the charging condition of the battery 90, the brake ECU 40 makes a judgment as to whether the battery 90 is fully charged.

When it is judged in the step S120 that the regenerative braking device is operable (i.e., YES in step S120), the brake ECU 40 proceeds to a step S130. Namely, the brake ECU 40 proceeds to the step S130 only when the following conditions are satisfied; the motor 70 operates normally, the input and output lines of the motor 70 are not broken or not short-circuited, and the battery 90 is not fully charged. In the step S130, an assigned braking force is obtained by subtracting a minimum braking force (later described) of a hydraulic braking device from the target vehicle braking force obtained in the step S110. The assigned braking force thus obtained is transmitted as a requested regenerative braking force to the regeneration ECU 10 (refer to step S130). The regeneration ECU 10 causes the motor ECU 20 to perform a regeneration control based on the requested regenerative braking force. An actual regenerative braking force produced by the motor 70 is detected. The detected actual regenerative braking force is returned as a producible regenerative braking force to the brake ECU 40. The brake ECU 40 receives the producible regenerative braking force sent from the regeneration ECU 10 (refer to step S140). The brake ECU 40 obtains a target braking force of the hydraulic braking device (i.e., a target hydraulic braking force) which is obtained by subtracting the producible regenerative braking force from the target vehicle braking force (refer to step S150). In other words, the target hydraulic braking force is equal to a sum of the minimum braking force and a distributive braking force. The distributive braking force is equal to a difference between the requested regenerative braking force and the producible regenerative braking force. Then, the control flow proceeds to step S160.

On the other hand, when it is judged in the step S120 that the regenerative braking device is inoperable (i.e., NO in step S120), the control flow proceeds to step S155. Namely, the brake ECU 40 proceeds to the step S155 when the following conditions are satisfied; the motor 70 does not operate normally, or the input and output lines of the motor 70 are broken or short-circuited, or the battery 90 is fully charged. In the step S155, the target vehicle braking force obtained in the step S110 is output as a target hydraulic braking force. Thereafter, the control flow proceeds to the step S160. As apparent from the foregoing description, the regenerative braking force is regarded as being equal to zero when the regenerative braking device is inoperable. In such a case, all of the target vehicle braking force is supplied from the hydraulic braking device.

Then, a target M/C pressure corresponding to the target hydraulic braking force of the step S150 or S155 is obtained based on a map or a table or an equation stored in the memory (refer to step S160). The boost ratio of vacuum booster 50 is controlled by switching the reaction force adjusting solenoid valve 67 in such a manner that the actual M/C pressure (i.e., the pressure in the front M/C chamber 51a) is equalized to the target M/C pressure (refer to step S170). More specifically, the boost ratio control is performed in the following manner. The M/C pressure is equal to the W/C pressure during an ordinary braking operation (e.g., an ABS non-operating condition). Thus, an oil pressure detected by a hydraulic sensor provided somewhere in a path connecting the front M/C chamber 51a to each W/C is compared with the target M/C pressure to obtain a difference. A feedback control is performed to eliminate this difference.

To judge the operability of the regenerative braking force, it may be possible to omit the judgment of step S120 so that the control flow directly proceeds from step 110 to step 130. For example, when the motor 70 is unable to rotate, the inoperable condition of motor 70 is detectable in the step S140 because the producible regenerative braking force received from the regeneration ECU 10 becomes zero in step S140. In this case, the target vehicle braking force agrees with the target hydraulic braking force in the step S150. As a result, like the processing of step S155, all of the target vehicle braking force is supplied from the hydraulic braking device. However, prosecuting all of the steps S130, S140, and S150 takes a significant time. The overall processing cannot be accomplished promptly. On the contrary, providing the step S120 makes it possible to promptly respond to an inoperable condition of the regenerative braking device. When the producible regenerative braking force is likely to be zero, the control flow directly proceeds to the step S155 to equalize the target hydraulic braking force with the target vehicle braking force.

The vacuum booster 50 operates in the same manner as that explained in the first embodiment. Therefore, the above-described detailed explanation of the first embodiment with reference to FIGS. 2 to 5 is equally applied to the vacuum booster 50 of the third embodiment.

Returning to a step S170 in the flowchart shown in FIG. 13, the boost ratio control of the booster is performed in the following manner. In the boost ratio control of the booster, the brake ECU 40 is set to the first reaction force mode when the target M/C pressure corresponding to a pedal depression force is equal to a M/C pressure corresponding to the minimum braking force of the hydraulic braking device, i.e., when the requested regenerative braking force (=assigned braking force) is identical with the producible regenerative braking force. In this case, the M/C pressure is obtained in accordance with the mechanically determined boost ratio. Thus, the hydraulic braking device produces the minimum braking force. On the other hand, the target M/C pressure corresponding to a pedal depression force may exceed the M/C pressure corresponding to the minimum braking force of the hydraulic braking device. In other words, the requested regenerative braking force (=assigned braking force) may be larger than the producible regenerative braking force. In such a case, the brake ECU 40 adequately selects the first reaction force mode or the second reaction force mode, i.e., adequately switches the reaction force adjusting solenoid valve 67, to feedback controls the actual M/C pressure to the target M/C pressure. With this feedback control, the boost ratio exceeds the mechanically determined boost ratio. Thus, the M/C pressure is obtained in accordance with this boost ratio and the target hydraulic braking force is attained.

In the graph shown in FIG. 7, when the regenerative braking device is inoperable (i.e., when the judgment result of the step S120 is NO), the target M/C pressure agrees with the target vehicle braking force. The M/C pressure is represented by a point on the straight line H corresponding to its pedal depression force.

In the graph of FIG. 8, no generative braking force is available in the beginning of the depression of the brake pedal BP (refer to phase I). Thus, the judgment result becomes NO in step S120 of FIG. 13. All of the assigned braking force (=requested regenerative braking force) is produced by the hydraulic braking device. The boost ratio of the booster is controlled so as to obtain the target vehicle braking force which is a sum of the minimum braking force of the hydraulic braking device and the assigned braking force. In this case, the boost ratio of the booster agrees with the straight line H shown in FIG. 7. Thereafter, due to some amount of discharging, the battery 90 comes to a condition that the regenerative braking force is producible. Thus, the judgment result becomes YES in step S120 of FIG. 13. The producible regenerative braking force gradually increases (refer to phase II). The distributive braking force is obtained by subtracting the producible regenerative braking force from the assigned braking force. The boost ratio of the booster is controlled so as to obtain a sum of the distributive braking force thus obtained and the minimum braking force. In this case, the boost ratio of the booster varies in the range between the straight line H and the straight line L shown in FIG. 7. Furthermore, when the producible regenerative braking force is maximized (refer to phase III), all of the assigned braking force is supplied from the regenerative braking device. Accordingly, the boost ratio of the booster is controlled so as to cause the hydraulic braking device to produce the minimum braking force. In this case, the boost ratio of the booster agrees with the straight line L shown in FIG. 7. Thereafter, the producible regenerative braking force gradually decreases (refer to phase IV). The distributive braking force is obtained by subtracting the producible regenerative braking force from the assigned braking force. The boost ratio of the booster is controlled so as to obtain a sum of the distributive braking force thus obtained and the minimum braking force. In this case, the boost ratio of the booster varies in the range between the straight line H and the straight line L shown in FIG. 7.

Figure 14:
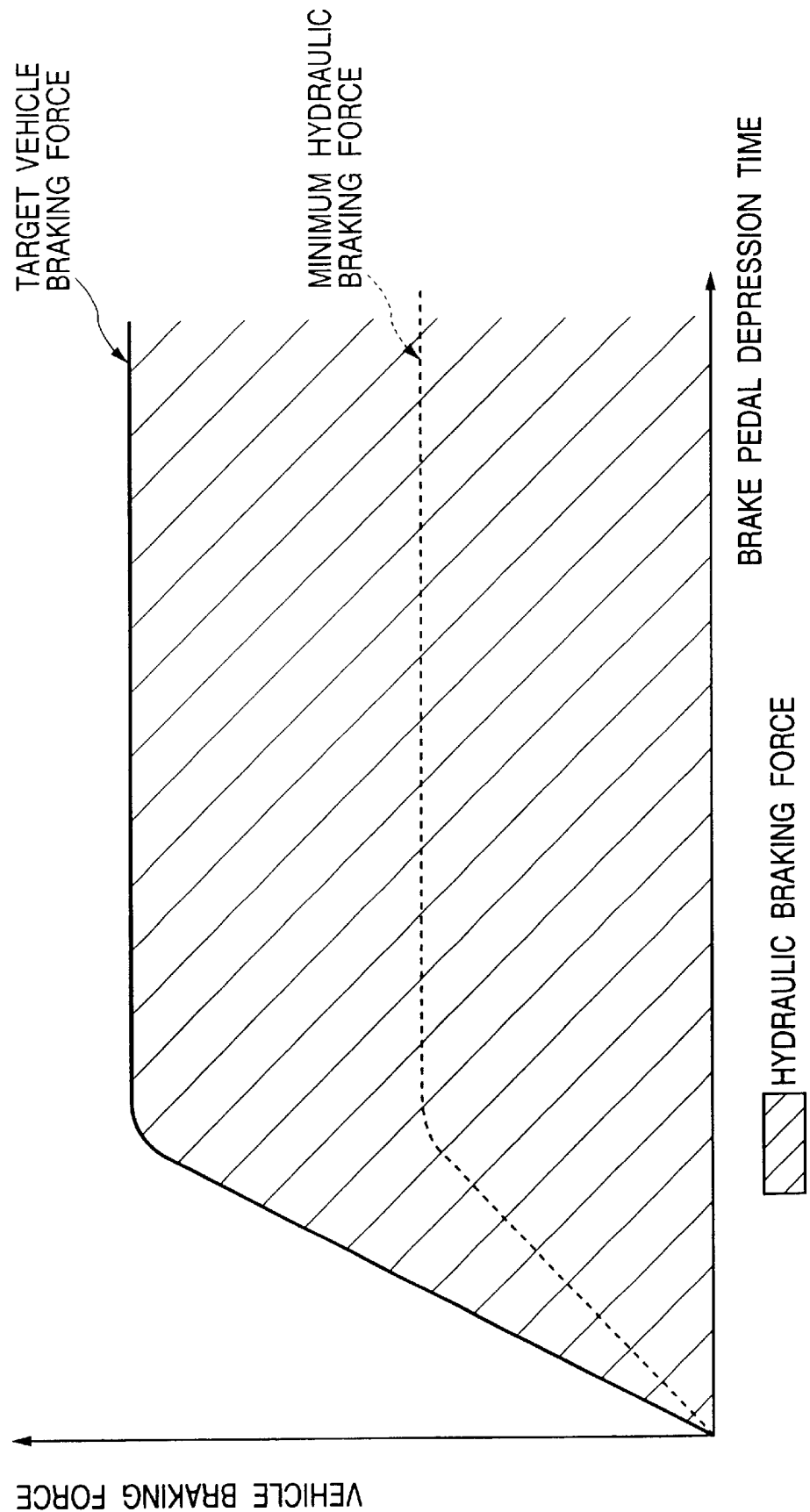
FIG. 14 is a graph showing the relationship between the pedal depression time and the vehicle braking force in accordance with the third through fifth embodiments of the present invention.

Like FIG. 8, FIG. 14 is a graph showing the relationship between the depression time of the brake pedal BP and the vehicle braking force. This graph is drawn based on the assumption that no regenerative braking force is available all the time due to failure or damage of the motor 70. In the graph of FIG. 14, the generative braking force is not available all the time from the beginning of the depression of the brake pedal BP. Thus, the judgment result always becomes NO in step S120 of FIG. 13. The boost ratio of the booster is controlled in such a manner that all of the target vehicle braking force is supplied from the hydraulic braking device. In this case, the boost ratio of the booster agrees with the straight line H shown in FIG. 7.

The depression force sensor 41 of this embodiment serves as input value detecting means of the present invention. The brake ECU 40 serves as target vehicle braking force output means, assigned braking force output means, auxiliary brake operability judging means, and brake control means of the present invention. In the flowchart of FIG. 13, the step S110 represents the processing performed by the target vehicle braking force output means, the step S120 represents the processing of the auxiliary brake operability judging means, the step S130 represents the processing of the assigned braking force output means, and steps S150, S155, S160, and S170 represent the processing of the brake control means.

As described above, the third embodiment has the following effects.

① The hydraulic braking device always operates to attain the target vehicle braking force. Thus, it becomes possible to realize the cooperative control without using a conventional cooperative control valve which performs the valve switching operation for selectively actuating or deactivating the hydraulic braking device. The hydraulic brake device is controlled so as to promptly respond to an inoperable condition of the regenerative braking device.

② When the producible regenerative braking force is not smaller than the assigned braking force (i.e., requested regenerative braking force), all of the assigned braking force is supplied from the regenerative braking device. When the producible regenerative braking force is smaller than the assigned braking force, the hydraulic braking force is added as a supplement for filling a lack of braking force. In other words, the assigned braking force is supplied from the regenerative braking device as much as possible. This is effective to suppress the abrasion of the brake pad or the brake shoe used in the hydraulic braking device. The regeneration efficiency can be increased.

③ The vacuum booster 50 forcibly changes the reaction force of the pedal input shaft to adjust the boost ratio. Thus, it becomes possible to provide a relatively simple arrangement for adjusting the boost ratio.

④ The hydraulic braking device includes the vacuum booster 50 at the upstream side of the M/C 51. The vacuum booster 50 is equipped with the boost ratio adjusting mechanism. Thus, it is possible to employ a hydraulic circuit arrangement in which the M/C pressure agrees with the W/C pressure during an ordinary braking operation. In other words, the present invention does not require a conventional fail-safe mechanism (i.e., valves SMC1 and SMC2 and associated oil supply passage extending from M/C to corresponding W/C shown in FIG. 24). The circuit arrangement of the hydraulic braking device can be simplified.

Fourth Embodiment

The fourth embodiment differs from the third embodiment in that the vacuum booster 50 is replaced by the hydro booster 250 disclosed in the second embodiment.

The hydro booster 250 operates in the same manner as that explained in the second embodiment. Therefore, the above-described detailed explanation of the second embodiment with reference to FIGS. 9 to 12 is equally applied to the hydro booster 250 of the fourth embodiment.

The operation of the hybrid vehicle during a brake pedal operation in the fourth embodiment is performed in the same manner as in the third embodiment. Namely, the brake control of the hybrid vehicle of the fourth embodiment is performed in accordance with the flowchart shown in FIG. 13, although the boost ratio control in the step S170 is performed by the hydro booster 250.

According to the fourth embodiment, in the step S170 of the flowchart shown in FIG. 13, the boost ratio control of the booster is performed in the following manner. In the boost ratio control of the booster, the brake ECU 40 is set to the first output mode when the target M/C pressure corresponding to a pedal depression force is equal to a M/C pressure corresponding to the minimum braking force of the hydraulic braking device, i.e., when the requested regenerative braking force (=assigned braking force) is identical with the producible regenerative braking force. In this case, the M/C pressure is obtained in accordance with the mechanically determined boost ratio. Thus, the hydraulic braking device produces the minimum braking force. On the other hand, the target M/C pressure corresponding to a pedal depression force may exceed the M/C pressure corresponding to the minimum braking force of the hydraulic braking device. In other words, the requested regenerative braking force (=assigned braking force) may be larger than the producible regenerative braking force. In such a case, the brake ECU 40 is set to the second output mode and the valve opening pressure of the differential pressure regulating valve 266 is adequately changed to equalize the actual M/C pressure to the target M/C pressure. With this control, the boost ratio exceeds the mechanically determined boost ratio. Thus, the M/C pressure is obtained in accordance with this boost ratio and the target hydraulic braking force is attained. In the control of the valve opening pressure of the differential pressure regulating valve 266, it is preferable to obtain a valve opening pressure corresponding to the target M/C pressure by using a map or a table or an equation which is stored beforehand in a memory. The feedback control is performed so as to equalize the valve opening pressure of the differential pressure regulating valve 266 with the obtained valve opening pressure.

The relationship between the pedal depression force and the M/C pressure is substantially identical with that of the first embodiment shown in the graph of FIG. 7. In the fourth embodiment, the straight line L represents the characteristics of the first output mode. The region between the straight line L and the straight line H represents the characteristics of the second output mode. According to the first output mode, the M/C pressure is substantially dependent on the mechanically determined boost ratio. The M/C pressure is thus determined in proportion to the pedal depression force (refer to the straight line L). According to the second output mode, the boost ratio changes in accordance with the valve opening pressure of the differential pressure regulating valve 266. Thus, the M/C pressure responsive to the pedal depression force varies in the region between the straight line L and the straight line H.

Furthermore, the relationship between the depression time of the brake pedal BP and the vehicle braking force is substantially identical with that of the third embodiment shown in the graphs of FIGS. 8 and 14. Therefore, the detailed explanation of the graphs of FIGS. 8 and 14 in the third embodiment is equally applied to the fourth embodiment. Thus, the fourth embodiment brings substantially the same effects as those of the third embodiment.

Fifth Embodiment

Figure 15:
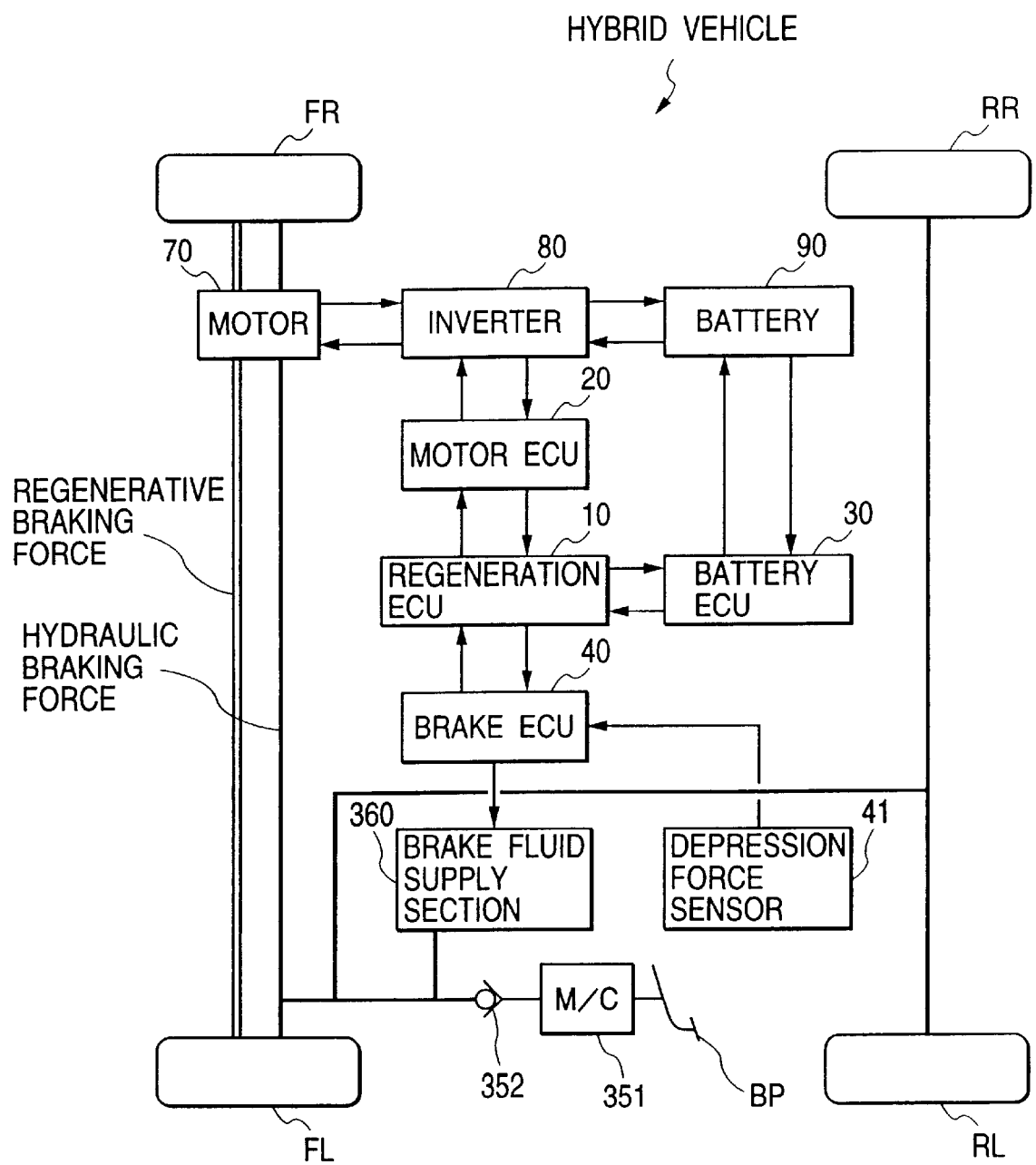
FIG. 15 is a block diagram schematically showing the system arrangement of a hybrid vehicle in accordance with fifth and sixth embodiments of the present invention.
Figure 16:
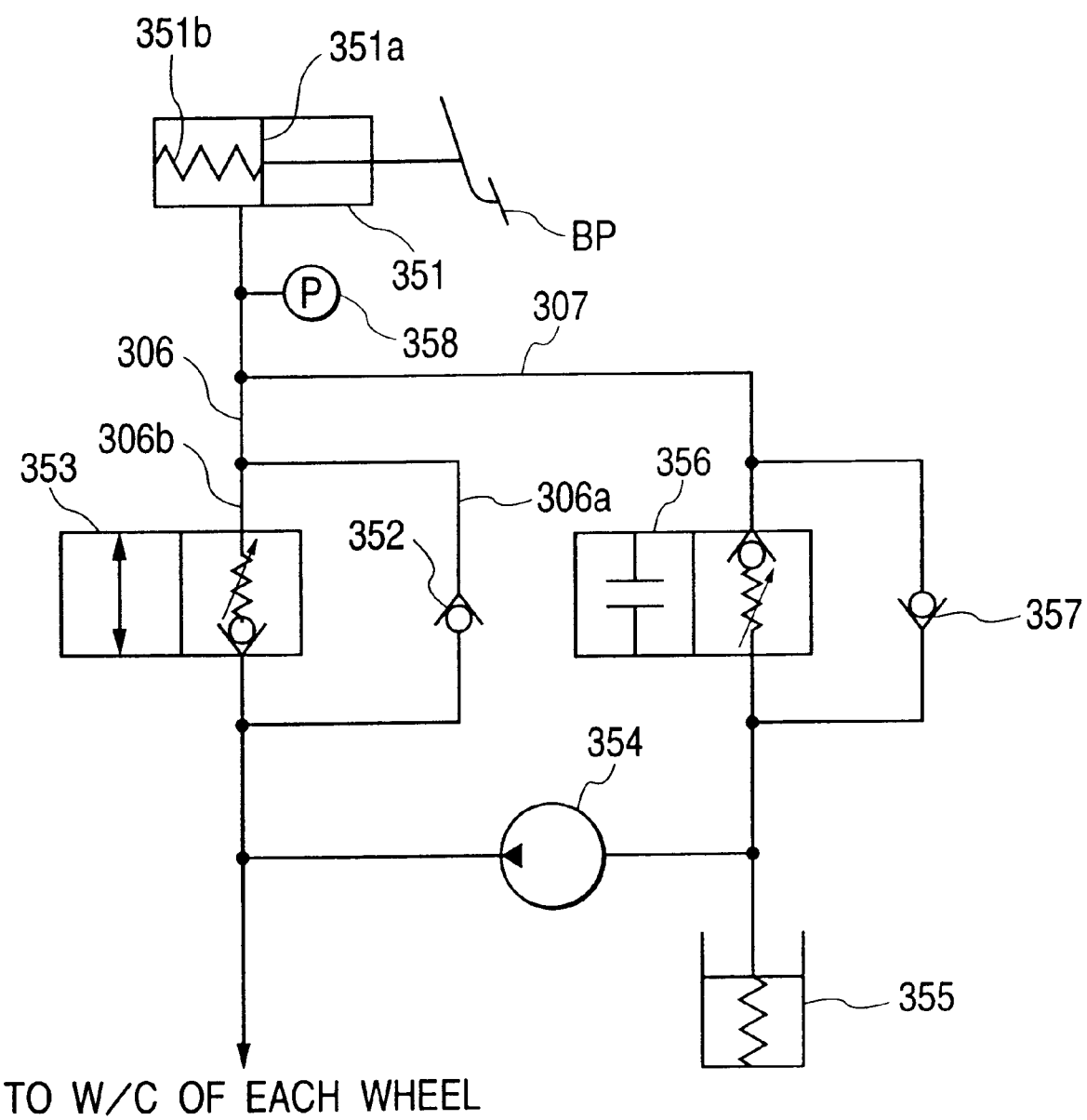
FIG. 16 is a diagram showing a hydraulic circuit arrangement in accordance with the fifth and sixth embodiments of the present invention.

FIG. 15 is a block diagram showing a system arrangement of a vehicle braking apparatus in accordance with a fifth embodiment of the present invention. FIG. 16 is a diagram showing a hydraulic circuit arrangement for the vehicle braking apparatus in accordance with the fifth embodiment of the present invention. The hybrid vehicle of the fifth embodiment is similar to that of the first embodiment but different in its detailed system arrangement that the vacuum booster 50 is replaced by a first check valve 352 maintaining the W/C pressure at a level not lower than the M/C pressure and a brake fluid supply section 360 controlling a brake fluid pressure transmitted to the W/C based on a control signal sent from the brake ECU 40. In the explanation of the hybrid vehicle of the fifth embodiment, the same components as those disclosed in the first embodiment are denoted by the same reference numerals and will not be explained.

The hydraulic circuit arrangement for the hydraulic braking device of the fifth embodiment will be explained with reference to FIG. 16. A M/C 351 comprises a M/C piston 351*a* which in slidable against a resilient force of a return spring 351*b* when the brake pedal BP is depressed. The M/C 351 produces a M/C pressure corresponding to a depression force applied on the brake pedal BP. If necessary, a booster can be provided in the M/C 351.

The M/C 351 is connected to a W/C of each wheel via an oil passage 306. The first check valve 352 and a W/C linear valve 353 are connected in parallel with each other in the oil passage 306. The first check valve 352 is provided in a first oil passage 306*a* connecting the M/C 351 to the W/C of each wheel. When the W/C pressure is lower than the M/C pressure, the first check valve 352 allows the brake fluid to flow from the M/C 351 to the W/C of each wheel. Thus, the first check valve 352 maintains the W/C pressure at a level not lower than the M/C pressure. The W/C linear valve 353 is provided in a second oil passage 306*b* connecting the M/C 351 to the W/C of each wheel. The W/C linear valve 353 is selectively switched between two positions in response to supply of electric power. When no electric power is supplied, the W/C linear valve 353 always opens the second oil passage 306b. When electric power is supplied, the W/C linear valve 353 opens the second oil passage 306b only when it receives a predetermined valve opening pressure. In other words, the W/C linear valve 353 acts as a differential pressure regulating valve under supply of electric power (refer to FIG. 16). The brake ECU 40 adjusts the valve opening pressure of the W/C linear valve 353 serving as the differential pressure regulating valve.

An oil pressure sensor 358 is provided between the M/C 351 and the W/C linear valve 353 for detecting the M/C pressure in the oil passage 306. The M/C pressure detected by the oil pressure sensor 358 is sent to the brake ECU 40. An outlet port of a hydraulic pump 354 is connected to the oil passage 206 between the W/C linear valve 353 and the W/C of each wheel. The hydraulic pump 354 is activated or deactivated in accordance with a control signal sent from the brake ECU 40. The hydraulic pump 354, when activated, pumps the brake fluid from the reservoir 355 and supplies pressurized brake fluid to the W/C of each wheel. The hydraulic pump 354 and the W/C linear valve 353 cooperatively constitute the brake fluid supply section 360. The reservoir 355 is provided separately from a M/C reservoir (not shown).

An oil passage 307 connects an intermediate point of the W/C linear valve 353 and the M/C 351 to the reservoir 355. A stroke simulator valve 356 and a second check valve 357 are connected in parallel with each other in the oil passage 307. When no electric power is supplied, the stroke simulator valve 356 disconnects the M/C 351 from the reservoir 355. When electric power is supplied, opening and closing of the stroke simulator valve 356 is switched at a predetermined valve opening pressure. In other words, the stroke simulator valve 356 acts as a differential pressure regulating valve under supply of electric power (refer to FIG. 16). The brake ECU 40 adjusts the valve opening pressure of the stroke simulator valve 356 serving as the differential pressure regulating valve. The valve opening pressure of the stroke simulator valve 356 should be determined considering the depression feeling of the brake pedal BP. For example, it is preferable to obtain a valve opening pressure of the stroke simulator valve 356 corresponding to a M/C pressure detected by the oil pressure sensor 358 with reference to a map, or a table or an equation which is stored beforehand in a memory. When the brake pedal BP is released, the M/C piston 351a returns to the home position by the resilient force of the return spring 351b. In this case, the brake fluid of the reservoir 355 is supplied via the second check valve 357 to the M/C 351 until the brake fluid amount in the M/C 351 restores to an initial amount. Thus, the oil amount flowing into the reservoir 355 is kept at a constant value.

Figure 17:
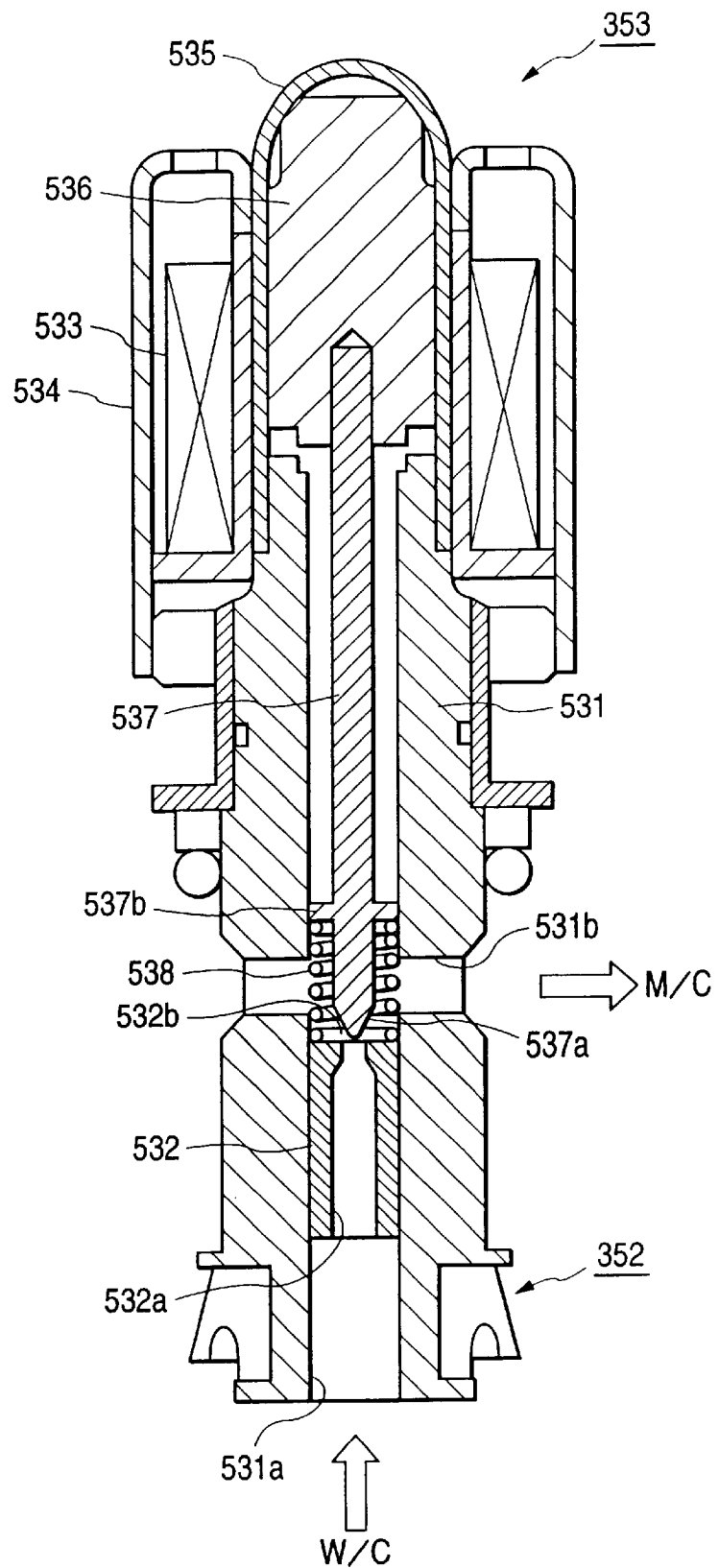
FIG. 17 is a cross-sectional view showing a W/C linear valve in accordance with the fifth and sixth embodiments of the present invention.

FIG. 17 is a cross-sectional view showing an example of the W/C linear valve 353. The W/C linear valve 353 chiefly consists of a guide 531, a seat valve 532, a coil 533, a plunger 536, and a shaft 537. The guide 531, made of a magnetic member, has a vertical through hole 531a extending along an axis of a cylindrical body thereof. Furthermore, the guide 531 has a lateral through hole 531b extending in a direction substantially normal to the vertical through hole 531a. The seat valve 532 is press fitted into the vertical through hole 531a so as to be positioned lower than the lateral through hole 531b. The seat valve 532 is a cylindrical body having a through hole 532a extending in the axis direction thereof.

The coil 533 serving as a solenoid is housed in a yoke 534 positioned above the guide 531. The coil 533 is electrically connected to the brake ECU 40. The brake ECU 40 selectively activates or deactivates the coil 533 and controls a current amount flowing across the coil 533. A sleeve 535, made of a non-magnetic member, is disposed inside the coil 533. The plunger 536 is a movable iron core accommodated in an side space of the sleeve 535 so as to be slidable in the axial direction. A shaft 537, made of a non-magnetic member, is caulked into an axial bore of the plunger 536. The plunger 536 and the shaft 537 are integrally slidable in the axial direction. The shaft 537 has a valve body 537a opposing to a seat surface 532b of the seat valve 532. Furthermore, the shaft 537 has a flange 537b. A spring 538 is interposed between the flange 537b and the seat valve 532. The spring 538 resiliently urges the shaft 537 and the plunger 536 upward. The vertical through hole 531a can communicate with the lateral through hole 531b via the seat valve 532, or via the first check valve 352 accommodated in the W/C linear valve 353.

The W/C linear valve 353 communicates with the W/C of each wheel and W/C 51. The vertical through hole 531a of the guide 531 has a lower opening communicating with the W/C of each wheel. The lateral through hole 531b of the guide 531 communicates with the M/C 351. When no electric power is supplied to the coil 533, the valve body 537a is separated upward from the seat surface 532b by the resilient force of the spring 538. In this case, the W/C linear valve 353 is in an opened condition (i.e., normal opened condition). When electric power is supplied to the coil 533, the coil 533 generates an attraction force in accordance with a current amount. With this attraction force, the guide 531 attracts the plunger 536. The valve body 537a is stopped at a position where the attraction force is balanced with the resilient force of the spring 538. More specifically, the following relationship is established in the balance condition.

$$Fi = Fs + P \times S$$

where Fi represents an attraction force, Fs represents a spring force, P represents a valve opening pressure, S represents an area of the oil passage in the seat valve.

The first check valve 352 allows the brake fluid to flow from the M/C 351 to the W/C when the M/C pressure is higher than the W/C pressure. The first check valve 352 prevents the brake fluid from flowing from the W/C to the M/C 351 when the M/C pressure is lower than the W/C pressure. In the latter case, the brake fluid flows from the W/C to the M/C 351 via the seat valve 532.

Figure 18:
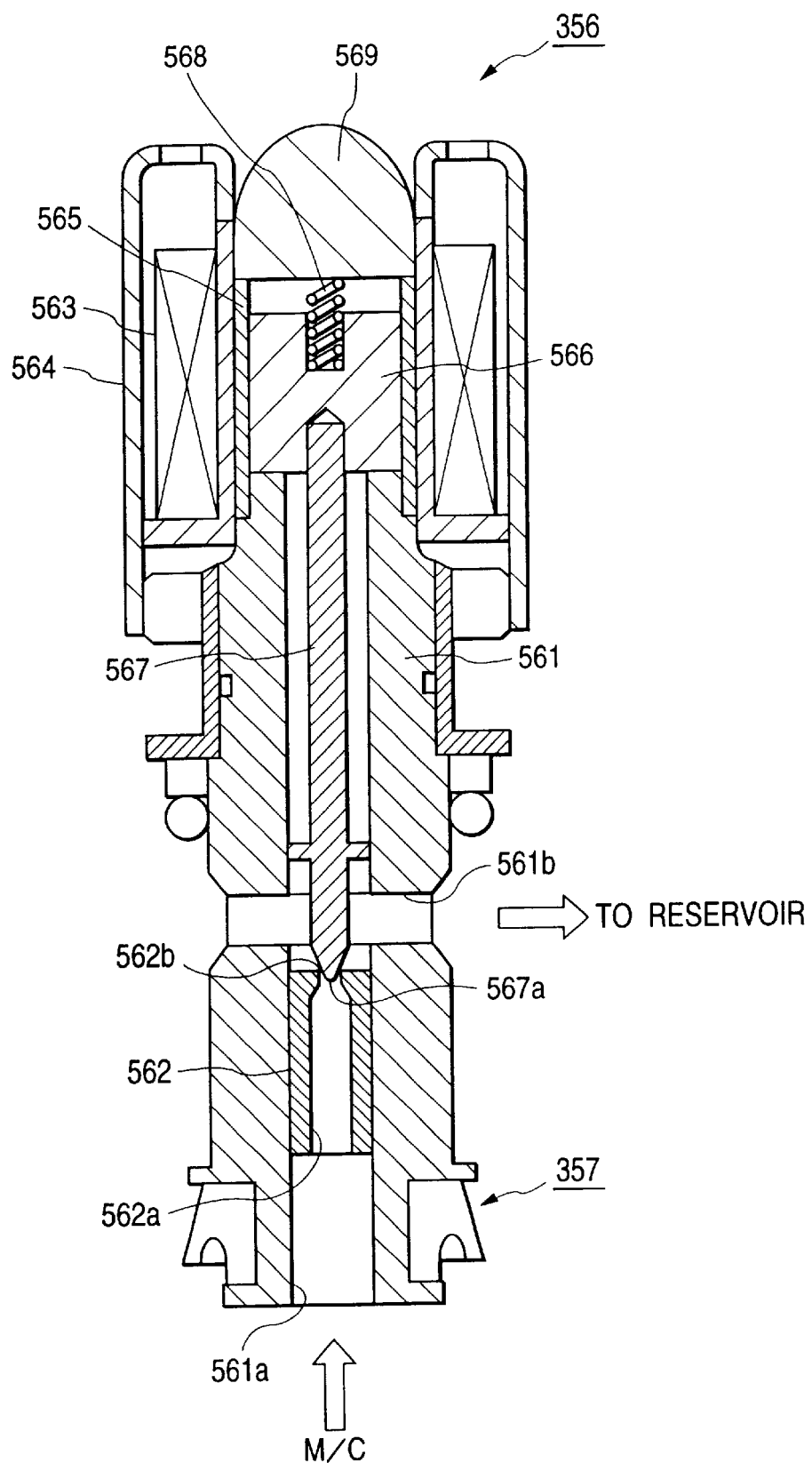
FIG. 18 is a cross-sectional view showing a stroke simulator valve in accordance with the fifth and sixth embodiments of the present invention.

FIG. 18 is a cross-sectional view showing an example of the stroke simulator valve 356. The stroke simulator valve 356 chiefly consists of a guide 561, a seat valve 562, a coil 563, a plunger 566, and a shaft 567. The guide 561, made of a non-magnetic member, has a vertical through hole 561a extending along an axis of a cylindrical body thereof. Furthermore, the guide 561 has a lateral through hole 561b extending in a direction substantially normal to the vertical through hole 561a. The seat valve 562 is press fitted into the vertical through hole 561a so as to be positioned lower than the lateral through hole 561b. The seat valve 562 is a cylindrical body having a through hole 562a extending in the axis direction thereof.

The coil 563 serving as a solenoid is housed in a yoke 564 positioned above the guide 561. The coil 563 is electrically connected to the brake ECU 40. The brake ECU 40 selectively activates or deactivates the coil 563 and controls a current flowing across the coil 563. A sleeve 565, made of a non-magnetic member, is disposed inside the coil 563. The plunger 566 is a movable iron core accommodated in an side space of the sleeve 565 so as to be slidable in the axial direction. A core stator 569, made of a magnetic member, is disposed above the plunger 566. A spring 568 is interposed between the core stator 569 and the plunger 566. A shaft 567, made of a non-magnetic member, is caulked into an axial bore of the plunger 566. The plunger 566 and the shaft 567 are integrally slidable in the axial direction. The shaft 567 has a valve body 567a opposing to a seat surface 562b of the seat valve 562. The spring 568 resiliently urges the shaft 567 and the plunger 566 downward. The vertical through hole 561a can communicate with the lateral through hole 561b via the seat valve 562, or via the second check valve 357 accommodated in the stroke simulator valve 356.

The stroke simulator valve 356 communicates with the W/C of each wheel and W/C 351. The vertical through hole 561a of the guide 561 has a lower opening communicating with the M/C 351. The lateral through hole 561b of the guide 561 communicates with the reservoir 355. When no electric power is supplied to the coil 563, the valve body 567a is brought into contact with the seat surface 562b by the resilient force of the spring 568. In this case, the stroke simulator valve 356 is in a closed condition (i.e., normal opened condition). When electric power is supplied to the coil 563, the coil 563 generates an attraction force in accordance with a current amount. With this attraction force, the core stator 569 attracts the plunger 566. The valve body 567a is stopped at a position where the attraction force is balanced with the resilient force of the spring 568.

The second check valve 357 allows the brake fluid to flow from the reservoir 355 to the M/C 351 when the reservoir pressure is higher than the M/C pressure. The second check valve 357 prevents the brake fluid from flowing from the M/C 351 to the reservoir 355 when the reservoir pressure is lower than the M/C pressure. In the latter case, the brake fluid flows from the M/C 351 to the reservoir 355 via the seat valve 562.

Figure 19:
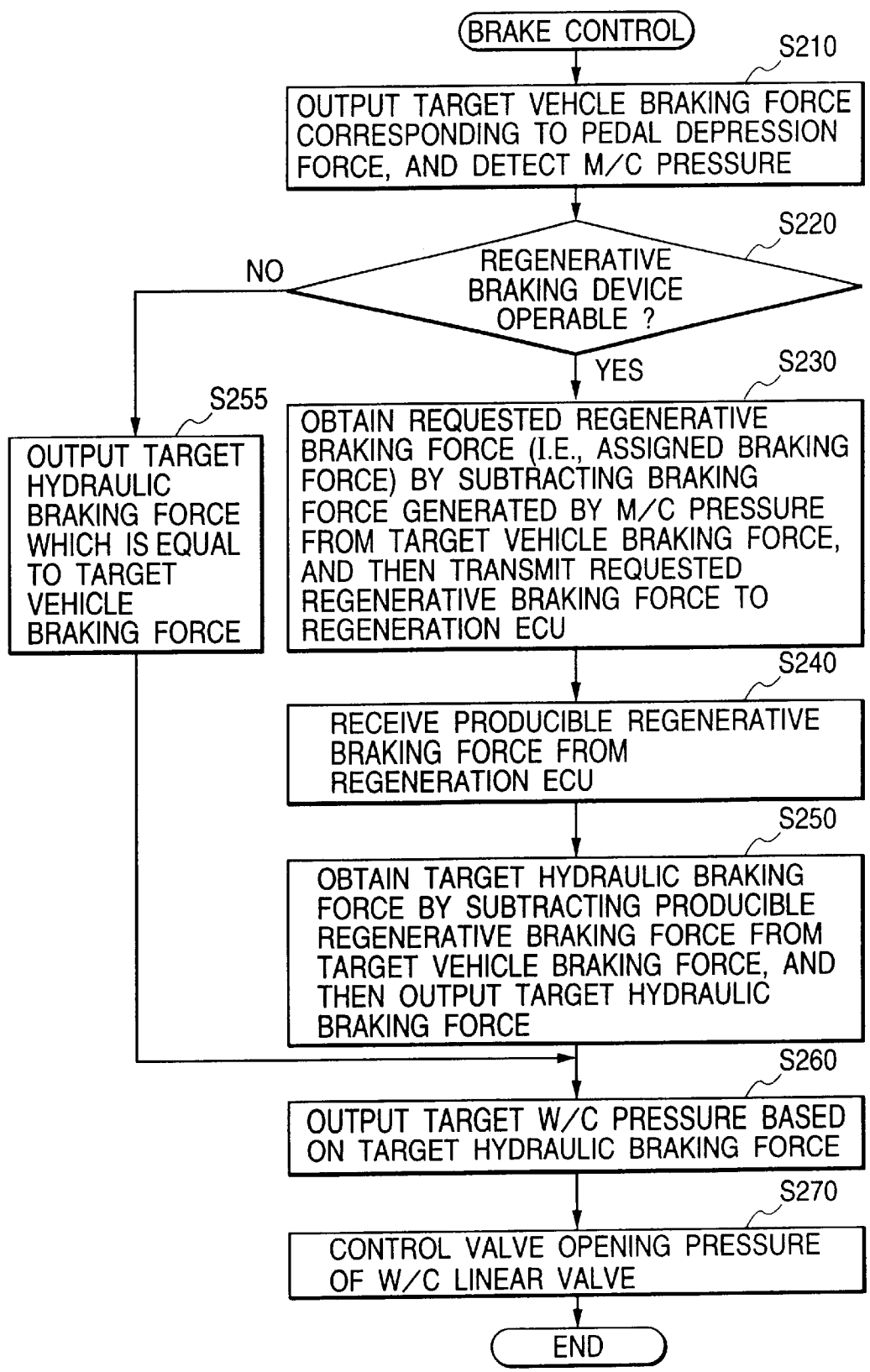
FIG. 19 is a flowchart showing a brake control in accordance with the fifth embodiment of the present invention.

Next, an operation of the hybrid vehicle during the brake pedal operation in accordance with the fifth embodiment of the present invention will be explained with reference to FIG. 19. FIG. 19 is a flowchart showing a brake control repetitively performed by the brake ECU 40 in response to a depression of the brake pedal BP. When the vehicle is cruising (i.e., when the brake pedal BP is not depressed), no electric power is supplied to the W/C linear valve 353 and the stroke simulator valve 356. When the brake pedal BP is depressed, electric power is supplied to the W/C linear valve 353 and the stroke simulator valve 356 each acting as a differential pressure regulating valve (refer to FIG. 16).

When the driver depresses the brake pedal BP, the depression force sensor 41 outputs a pedal depression force, serving as a brake pedal input value, to the brake ECU 40. The brake ECU 40 obtains a target vehicle braking force corresponding to the pedal depression force with reference to a map or a table or an equation stored in a memory, and inputs the M/C pressure from the oil pressure sensor 358 (refer to step S210).

Next, the brake ECU 40 checks whether or not the regenerative braking device is operable (refer to step S220). The judgment of step S220 is performed in the same manner as in the step S120 of the third embodiment. Therefore, the processing in the step S220 will not be explained in detail. When the brake ECU 40 judges that the regenerative braking device is operable (i.e., YES in S220), the brake ECU 40 obtains an assigned braking force by subtracting a braking force generated by the M/C pressure (i.e., a minimum braking force of the hydraulic braking device) from the target vehicle braking force obtained in the step S210. The assigned braking force thus obtained is transmitted as a requested regenerative braking force to the regeneration ECU 10 (refer to step S230). The regeneration ECU 10 causes the motor ECU 20 to perform a regeneration control based on the requested regenerative braking force. An actual regenerative braking force produced by the motor 70 is detected. The detected actual regenerative braking force is returned as a producible regenerative braking force to the brake ECU 40. The brake ECU 40 receives the producible regenerative braking force sent from the regeneration ECU 10 (refer to step S240). The brake ECU 40 obtains a target braking force of the hydraulic braking device (i.e., a target hydraulic braking force) which is obtained by subtracting the producible regenerative braking force from the target vehicle braking force (refer to step S250). In other words, the target hydraulic braking force is equal to a sum of the braking force generated by the M/C pressure and a distributive braking force. The distributive braking force is equal to a difference between the requested regenerative braking force and the producible regenerative braking force. Then, the control flow proceeds to step S260.

On the other hand, when it is judged in the step S220 that the regenerative braking device is inoperable (i.e., NO in step S220), the control flow proceeds to step S255. In the step S255, the target vehicle braking force obtained in the step S210 is output as a target hydraulic braking force. Thereafter, the control flow proceeds to the step S260. As apparent from the foregoing description, the regenerative braking force is regarded as being equal to zero when the regenerative braking device is inoperable. In such a case, all of the target vehicle braking force is supplied from the hydraulic braking device.

Then, a target W/C pressure corresponding to the target hydraulic braking force of the step S250 or S255 is obtained based on a map or a table or an equation stored in the memory (refer to step S260). The valve opening pressure of the W/C linear valve 353 and the hydraulic pump 354 are controlled in such a manner that the actual W/C pressure is equalized to the target W/C pressure (refer to step S270). The W/C pressure is equal to a sum of the M/C pressure and the valve opening pressure (i.e., W/C pressure=M/C pressure+valve opening pressure). Thus, in the control of the valve opening pressure of the W/C linear valve 353, the valve opening pressure is set to be equal to a value obtained by subtracting the M/C pressure from the target W/C pressure.

To detect the operability of the regenerative braking device, it may be possible to omit the judgment of step S220 so that the control flow directly proceeds from step 210 to step 230. In this case, like the processing of step S255, it is possible to supply all of the target vehicle braking force from the hydraulic braking device. However, prosecuting all of the steps S230, S240, and S250 takes a significant time. The overall processing cannot be accomplished promptly. On the contrary, providing the step S220 makes it possible to promptly respond to an inoperable condition of the regenerative braking device.

According to the fifth embodiment, when the hydraulic pump 354 is failed, the brake ECU 40 deactivates the M/C linear valve 353 and the stroke simulator valve 56. Namely, no electric power is supplied to the M/C linear valve 353 and the stroke simulator valve 356. The M/C linear valve 353 is kept opened, while the stroke simulator valve 356 is closed. The W/C pressure is equalized to the M/C pressure. Thus, it is possible to apply the minimum braking force to the vehicle. Thereafter, when the brake pedal BP is released, the M/C pressure decreases and the W/C pressure decreases correspondingly. Furthermore, as the stroke simulator valve 356 is closed, the M/C 351 is isolated from the reservoir 355. It is possible to prevent the brake pedal BP from causing a useless stroke. In this respect, the conventional system shown in FIG. 24 always supplies the oil to the stroke simulator SSI. It is therefore necessary, in case of failure, to supply the oil to both of the W/C and the stroke simulator SSI. The relationship between the deceleration and the depression force as well as the relationship between the deceleration and the pedal stroke are differentiated from the normal ones. On the other hand, according to the fifth embodiment, the relationship between the deceleration and the pedal stroke remains unchanged.

However, if the hydraulic pump 354 and the W/C linear valve 353 are failed simultaneously, the W/C linear valve 353 will not be switched from the activated condition to the deactivated condition. Even in such a case, the first check valve 352 is surely opened evert time the M/C pressure exceeds the W/C pressure in response to the depression of the brake pedal BP. Thus, the W/C pressure is equalized to the M/C pressure. The hydraulic braking device can apply the minimum braking force to the vehicle, thereby assuring the fail safe. In this condition, the W/C pressure does not reduce after the brake pedal BP is released. It is however not problem from the view point of the fail safe. In other words, according to the fifth embodiment, even when the hydraulic pump 354 is failed and the W/C linear valve 353 cannot be deactivated, the presence of the first check valve 352 assures the fail safe mechanism for applying the minimum braking force to the vehicle.

Figure 20:
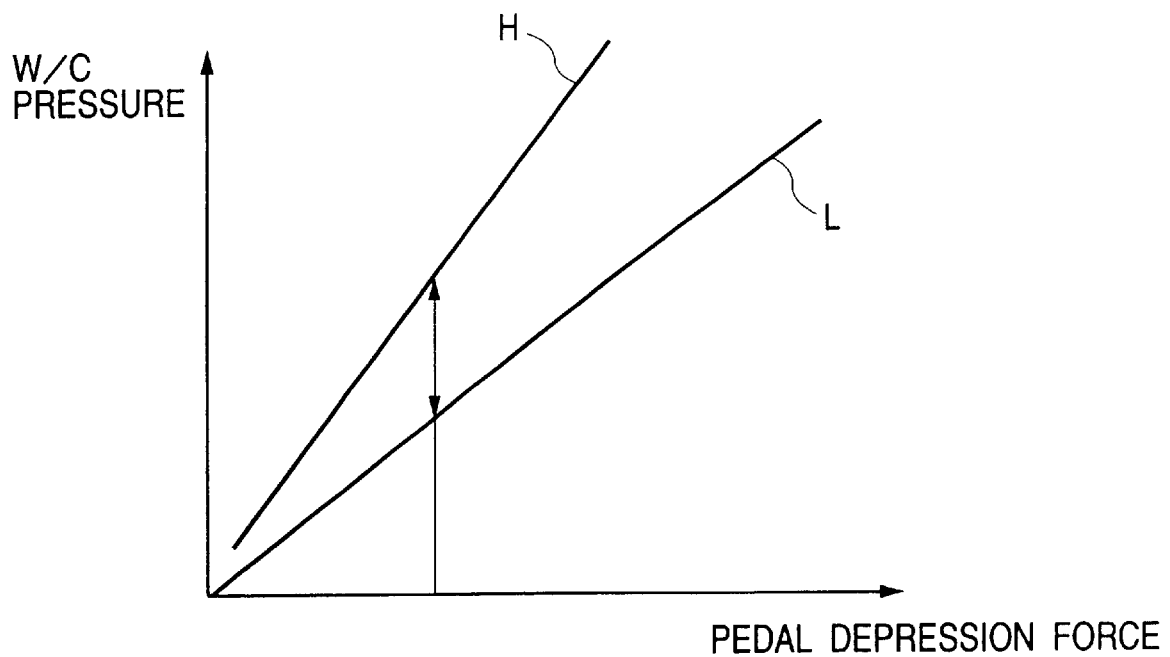
FIG. 20 is a graph showing the relationship between the pedal depression force and the W/C pressure in accordance with the fifth and sixth embodiments of the present invention.

FIG. 20 is a graph showing the relationship between the pedal depression force and the W/C pressure. The valve opening pressure control of the W/C linear valve 353 in the step S270 shown in FIG. 19 is performed in the following manner. When the producible regenerative braking force is a maximum value, i.e., when the producible regenerative braking force is equal to the requested regenerative braking force, the brake ECU 40 equalizes the valve opening pressure to a minimum value (i.e., zero). In this case, the relationship between the pedal depression force and the W/C pressure is represented by the straight line L shown in FIG. 20. The straight line L represents the characteristics of the minimum braking force of the hydraulic braking device. The minimum braking force of hydraulic braking device is set to be not smaller than a minimum vehicle braking force required according to law regulations. When the producible regenerative braking force is a minimum value (i.e., zero), e.g., when the judgment result of step S220 is NO in the flowchart of FIG. 19, the brake ECU 40 sets the valve opening pressure so that the relationship between the pedal depression force and the W/C pressure is represented by a straight line H shown in FIG. 20. Namely, the braking force of the hydraulic braking device is equalized to the target vehicle braking force. Furthermore, when the producible regenerative braking force is an intermediate value between zero and the maximum value, the brake ECU 40 sets the valve opening pressure so that the relationship between the pedal depression force and the W/C pressure exists somewhere in a region between the straight line L and the straight line H shown in FIG. 20.

The relationship between the depression time of the brake pedal BP and the vehicle braking force is substantially identical with that of the third embodiment shown in the graphs of FIGS. 8 and 14.

In the graph of FIG. 8, no generative braking force is available in the beginning of the depression of the brake pedal BP (refer to phase I).Thus, the judgment result becomes NO in the step S220 of FIG. 19. All of the assigned braking force (=requested regenerative braking force) is produced by the hydraulic braking device. The valve opening pressure of the W/C linear valve 353 is controlled so as to obtain the target vehicle braking force which is a sum of the minimum braking force of the hydraulic braking device and the assigned braking force. In this case, the W/C pressure agrees with the straight line H shown in FIG. 20. Thereafter, due to some amount of discharging, the battery 90 comes to a condition that the regenerative braking force is producible. The judgment result becomes YES in the step S220 of FIG. 19. The producible regenerative braking force gradually increases (refer to phase II). The distributive braking force is obtained by subtracting the producible regenerative braking force from the assigned braking force. The valve opening pressure is controlled so as to correspond to the distributive braking force thus obtained. In this case, the W/C pressure varies in the range between the straight line H and the straight line L shown in FIG. 20. Furthermore, when the producible regenerative braking force is maximized (refer to phase III), all of the assigned braking force is supplied from the regenerative braking device. Accordingly, the valve opening pressure is controlled so as to be zero. In this case, the W/C pressure agrees with the M/C pressure. Namely, the W/C pressure is represented by the straight line L shown in FIG. 20. Thereafter, the producible regenerative braking force gradually decreases (refer to phase IV). The distributive braking force is obtained by subtracting the producible regenerative braking force from the assigned braking force. The valve opening pressure is controlled so as to correspond to the distributive braking force thus obtained. In this case, the W/C pressure varies in the range between the straight line H and the straight line L shown in FIG. 20.

In the graph of FIG. 14, the generative braking force is not available all the time from the beginning of the depression of the brake pedal BP. Thus, the judgment result always becomes NO in step S220 of FIG. 19. The valve opening pressure of the W/C linear valve is controlled in such a manner that all of the target vehicle braking force is supplied from the hydraulic braking device. In this case, the W/C pressure agrees with the straight line H shown in FIG. 20.

In the fifth embodiment, the first check valve 352 serves as check valve of the present invention. The hydraulic pump 354 serves as pump of the present invention. The W/C linear valve 353 serves as the control valve of the present invention. The depression force sensor 41 serves as input value detecting means of the present invention. The brake ECU 40 serves as target vehicle braking force output means, assigned braking force output means, auxiliary brake operability judging means, and brake control means of the present invention. In the flowchart of FIG. 19, the step S210 represents the processing performed by the target vehicle braking force output means, step S220 represents the processing of the auxiliary brake operability judging means, step S230 represents the processing of the assigned braking force output means, and steps S250, S255, S260 and S270 represent the processing of the brake control means.

As described above, the fifth embodiment has the following effects.

① The hydraulic braking device always operates to attain the target vehicle braking force. Thus, it becomes possible to realize the cooperative control without using a conventional cooperative control valve or switching solenoid valves which selectively actuate or deactivate the hydraulic braking device. The hydraulic circuit arrangement can be simplified.

Presence of the first check valve 352 ensures the fail safe mechanism. Furthermore, the hydraulic brake device is controlled so as to promptly respond to an inoperable condition of the regenerative braking device.

② When the producible regenerative braking force is not smaller than the assigned braking force (i.e., requested regenerative braking force), all of the assigned braking force is supplied from the regenerative braking device. When the producible regenerative braking force is smaller than the assigned braking force, the hydraulic braking force is added as a supplement for filling a lack of braking force. In other words, the assigned braking force is supplied from the regenerative braking device as much as possible. This is effective to suppress the abrasion of the brake pad or the brake shoe used in the hydraulic braking device. The regeneration efficiency can be increased.

③ The brake fluid supply section 360 can be simplified by using the hydraulic pump 354 and the W/C linear valve 353.

④ The stroke simulator valve 356, generating a pedal stroke in response to a brake pedal input, improves the brake feeling.

⑤ When the M/C pressure exceeds the W/C pressure in response to the depression of the brake pedal BP, the W/C pressure can immediately agree with the M/C pressure by the presence of the first check valve 352. Thus, adequate brake response can be realized.

The present invention should not be restricted to the above-described third to fifth embodiments. Therefore, this invention may be embodied in several forms without departing from the technical scope thereof.

For example, according to the above-described third to fifth embodiments, to perform the cooperative control, the brake ECU 40 obtains the information relating to the operability of the regenerative braking device from the regeneration ECU 10 and performs the judgment in the step S120 of FIG. 13 or in the step S220 of FIG. 19. However, it is possible for the brake ECU 40 to check the operating condition of the motor 70 by monitoring a current value or a voltage value of the motor 70. Furthermore, it is possible for the brake ECU 40 to check the breakage and/or short-circuit of the communication lines or disconnection of the connectors through monitoring signals of monitoring lines connecting the regeneration ECU 10 to respective ECUs 20, 30 and 40.

Furthermore, according to the above-described third to fifth embodiments, the fully charged condition of the battery is regarded as one aspect of the inoperable condition of the regenerative braking device. However, in view of the fact that the regenerative braking device is in good order, it is possible to judge that the regenerative braking device is operable. In this case, the inoperable condition of the regenerative braking device is detected only when the regenerative braking device is failed or damaged.

Furthermore, in the above-described third and fourth embodiments, it is possible to equalize the boost ratio for attaining all of the target vehicle braking force by the hydraulic braking device to the maximum boost ratio of the booster. More specifically, in the example of the third embodiment, the maximum boost ratio of the booster is the boost ratio in the second reaction force mode, i.e., the boost ratio in the condition where the reaction force adjusting solenoid valve 67 connects the reaction force adjusting chamber 66 to the high-pressure source $R_{HP}$. This boost ratio is equalized to the boost ratio for attaining all of the target vehicle braking force by the hydraulic braking device. In this case, only necessary thing is to hold the reaction force adjusting solenoid valve 67 at a position for connecting the reaction force adjusting chamber 66 to the high-pressure source $R_{HP}$ when the control flow proceeds to the step S155 as a result of denial (NO) in the step S 120 of FIG. 13. Thus, the processing is very simple.

Figure 21:
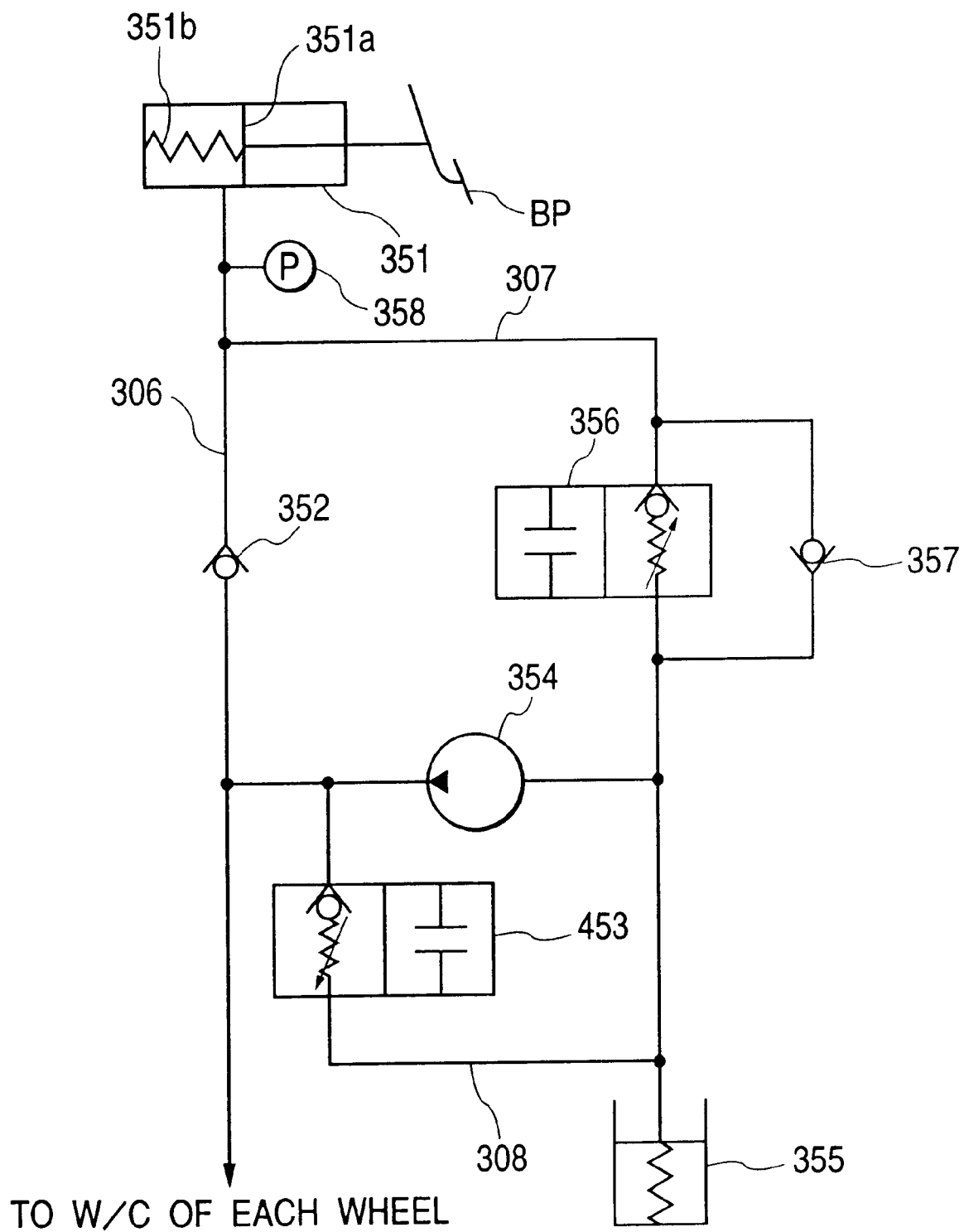
FIG. 21 is a diagram showing a hydraulic circuit arrangement in accordance with a modified fifth embodiment of the present invention.

Furthermore, the above-described fifth embodiment can be modified to employ a hydraulic circuit arrangement shown in FIG. 21. The hydraulic circuit arrangement shown in FIG. 21 differs from the circuit arrangement shown in FIG. 16 in that the second oil passage 306b and the W/C linear valve 353 are omitted and, instead, another oil passage 308 and a W/C linear valve 453 (normal close type) are provided. The oil passage 308 extends from the first check valve 352 to the reservoir 355. The W/C linear valve 453 is provided in the oil passage 308. In this case, the brake control is performed in the same manner as in the fifth embodiment. The valve opening pressure control in the step S270 of FIG. 19 is performed in the following manner. When the producible regenerative braking force is a maximum value, i.e., when the producible regenerative braking force is equal to the requested regenerative braking force, the valve opening pressure of the W/C linear valve 453 is equalized to zero so that the W/C pressure agrees with the M/C pressure. When the producible regenerative braking force is a minimum value (i.e., zero), the valve opening pressure of the W/C linear valve 453 is equalized to the maximum value so that the hydraulic braking pressure agrees with the target vehicle braking force. Furthermore, when the producible regenerative braking force is an intermediate value between zero and the maximum value, the valve opening pressure of the W/C linear valve 453 is set to be a value between the minimum value and the maximum value. Thus, it is possible to obtain substantially the same effects as those of the fifth embodiment.

Sixth Embodiment

The sixth embodiment is explained based on the same system arrangement and the same hydraulic circuit arrangement as those of the fifth embodiment. Namely, a vehicle braking apparatus of the sixth embodiment has a system arrangement shown in FIG. 15. A hydraulic circuit arrangement for the vehicle braking apparatus of the sixth embodiment is shown in FIG. 16. Therefore, the above-described detailed explanation of the fifth embodiment with reference to FIGS. 15 to 18 is equally applied to the system arrangement and the hydraulic circuit arrangement of the sixth embodiment.

Figure 22:
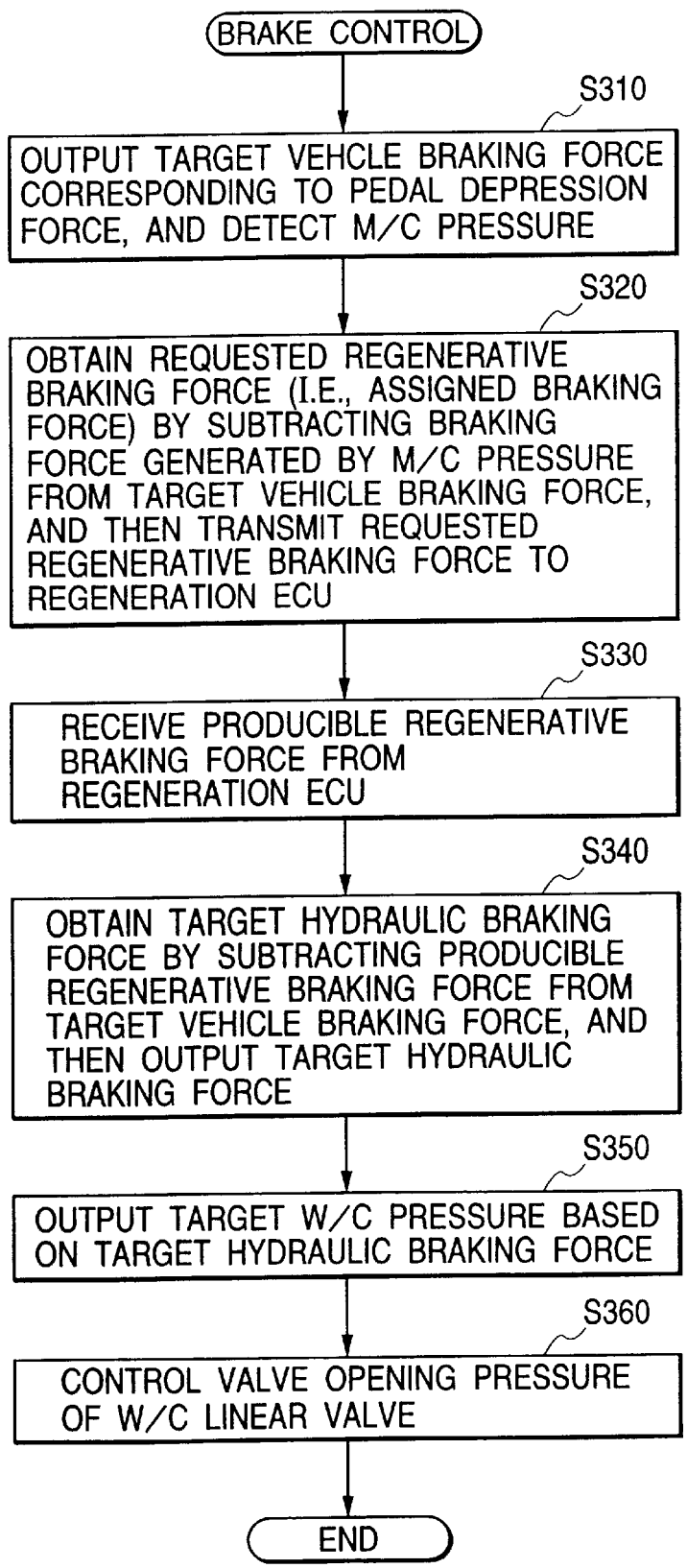
FIG. 22 is a flowchart showing a brake control in accordance with the sixth embodiment of the present invention.
Figure 23:
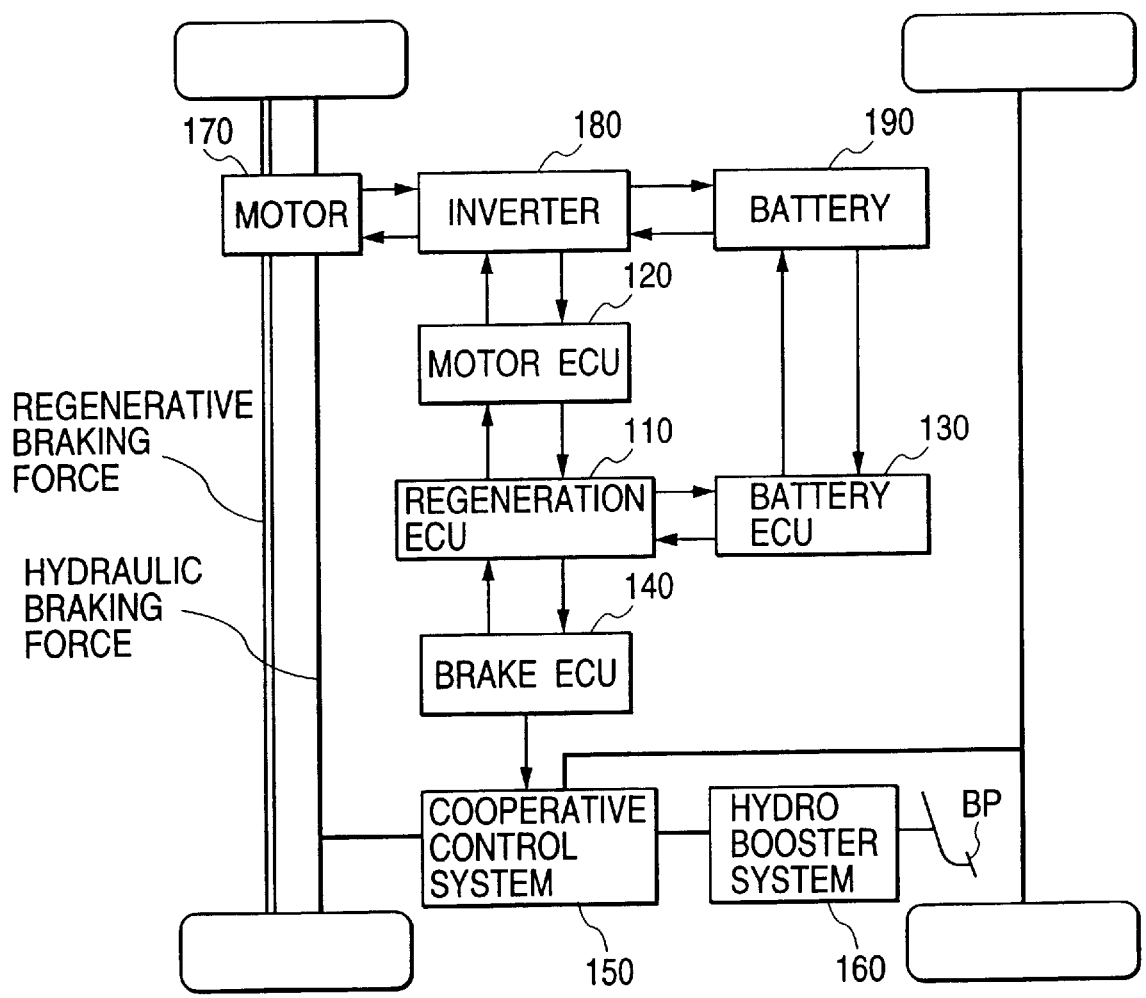
FIG. 23 is a block diagram schematically showing the system arrangement of a conventional hybrid vehicle.

Next, an operation of the hybrid vehicle during the brake pedal operation in accordance with the sixth embodiment will be explained with reference to FIG. 22. FIG. 22 is a flowchart showing a brake control repetitively performed by the brake ECU 40 in response to a depression of the brake pedal BP. When the vehicle is cruising (i.e., when the brake pedal BP is not depressed), no electric power is supplied to the W/C linear valve 353 and the stroke simulator valve 356. When the brake pedal BP is depressed, electric power is supplied to the W/C linear valve 353 and the stroke simulator valve 356 each acting as a differential pressure regulating valve (refer to FIG. 16).

When the driver depresses the brake pedal BP, the depression force sensor 41 outputs a pedal depression force, serving as a brake pedal input value, to the brake ECU 40. The brake ECU 40 obtains a target vehicle braking force corresponding to the pedal depression force with reference to a map or a table or an equation stored in a memory, and inputs the M/C pressure from the oil pressure sensor 358 (refer to step S310). Next, an assigned braking force is obtained by subtracting a braking force generated by the M/C pressure (i.e., a minimum braking force of the hydraulic braking device) from the target vehicle braking force. The assigned braking force thus obtained is transmitted as a requested regenerative braking force to the regeneration ECU 10 (refer to step S320). The regeneration ECU 10 causes the motor ECU 20 to perform a regeneration control based on the requested regenerative braking force. An actual regenerative braking force produced by the motor 70 is detected. The detected actual regenerative braking force is returned as a producible regenerative braking force to the brake ECU 40. The brake ECU 40 receives the producible regenerative braking force sent from the regeneration ECU 10 (refer to step S330). The brake ECU 40 obtains a target braking force of the hydraulic braking device (i.e., a target hydraulic braking force) which is obtained by subtracting the producible regenerative braking force from the target vehicle braking force (refer to step S340). In other words, the target hydraulic braking force is equal to a sum of the braking force generated by the M/C pressure and a distributive braking force. The distributive braking force is equal to a difference between the requested regenerative braking force and the producible regenerative braking force. Then, a target M/C pressure corresponding to the target hydraulic braking force is obtained based on a map or a table or an equation stored in the memory (refer to step S350). The valve opening pressure of the M/C linear valve 353 and the hydraulic pump 354 are controlled in such a manner that the actual W/C pressure is equalized to the target W/C pressure (refer to step S360). The W/C pressure is equal to a sum of the M/C pressure and the valve opening pressure (i.e., W/C pressure=M/C pressure+valve opening pressure). Thus, in the control of the valve opening pressure of the W/C linear valve 353, the valve opening pressure is set to be equal to a value obtained by subtracting the M/C pressure from the target W/C pressure.

According to the sixth embodiment, when the hydraulic pump 354 is failed, the brake ECU 40 deactivates the M/C linear valve 353 and the stroke simulator valve 356. Namely, no electric power is supplied to the M/C linear valve 353 and the stroke simulator valve 356. The M/C linear valve 353 is kept opened, while the stroke simulator valve 356 is closed. The W/C pressure is equalized to the M/C pressure. Thus, it is possible to apply the minimum braking force to the vehicle. Thereafter, when the brake pedal BP is released, the M/C pressure decreases and the W/C pressure decreases correspondingly. Furthermore, as the stroke simulator valve 356 is closed, the M/C 351 is isolated from the reservoir 355. It is possible to prevent the brake pedal BP from causing a useless stroke. In this respect, the conventional system shown in FIG. 24 always supplies the oil to the stroke simulator SSI. It is therefore necessary, in case of failure, to supply the oil to both of the W/C and the stroke simulator SSI. The relationship between the deceleration and the depression force as well as the relationship between the deceleration and the pedal stroke are differentiated from the normal ones. On the other hand, according to the sixth embodiment, the relationship between the deceleration and the pedal stroke remains unchanged.

However, if the hydraulic pump 354 and the W/C linear valve 353 are failed simultaneously, the W/C linear valve 353 will not be switched from the activated condition to the deactivated condition. Even in such a case, the first check valve 352 is surely opened evert time the M/C pressure exceeds the W/C pressure in response to the depression of the brake pedal BP. Thus, the W/C pressure is equalized to the M/C pressure. The hydraulic braking device can apply the minimum braking force to the vehicle, thereby assuring the fail safe. In this condition, the W/C pressure does not reduce after the brake pedal BP is released. It is however not problem from the view point of the fail safe. In other words, according to the sixth embodiment, even when the hydraulic pump 354 is failed and the W/C linear valve 353 cannot be deactivated, the presence of the first check valve 352 assures the fail safe mechanism for applying the minimum braking force to the vehicle.

The valve opening pressure control of the W/C linear valve 353 in the step S360 shown in FIG. 22 is performed in the following manner. When the producible regenerative braking force is a maximum value, i.e., when the producible regenerative braking force is equal to the requested regenerative braking force, the brake ECU 40 equalizes the valve opening pressure to a minimum value (i.e., zero). In this case, the relationship between the pedal depression force and the W/C pressure is represented by the straight line L shown in FIG. 20. The straight line L represents the characteristics of the minimum braking force of the hydraulic braking device. The minimum braking force of hydraulic braking device is set to be not smaller than a minimum vehicle braking force required according to law regulations. When the producible regenerative braking force is a minimum value (i.e., zero), the brake ECU 40 sets the valve opening pressure so that the relationship between the pedal depression force and the W/C pressure is represented by the straight line H shown in FIG. 20. Namely, the braking force of the hydraulic braking device is equalized to the target vehicle braking force. Furthermore, when the producible regenerative braking force is an intermediate value between zero and the maximum value, the brake ECU 40 sets the valve opening pressure so that the relationship between the pedal depression force and the W/C pressure exists somewhere in a region between the straight line L and the straight line H shown in FIG. 20.

In the graph of FIG. 8, no generative braking force is available in the beginning of the depression of the brake pedal BP (refer to phase I). Thus, all of the assigned braking force (=requested regenerative braking force) is produced by the hydraulic braking device. The valve opening pressure of the W/C linear valve 353 is controlled so as to obtain the target vehicle braking force which is a sum of the braking force generated by the M/C pressure (i.e., the minimum hydraulic braking force) and the assigned braking force. In this case, the W/C pressure agrees with the straight line H shown in FIG. 20. Thereafter, due to some amount of discharging, the battery 90 comes to a condition that the regenerative braking force is producible. The producible regenerative braking force gradually increases (refer to phase II). The distributive braking force is obtained by subtracting the producible regenerative braking force from the assigned braking force. The valve opening pressure is controlled so as to correspond to the distributive braking force thus obtained. In this case, the W/C pressure varies in the range between the straight line H and the straight line L shown in FIG. 20. Furthermore, when the producible regenerative braking force is maximized (refer to phase III), all of the assigned braking force is supplied from the regenerative braking device. Accordingly, the valve opening pressure is controlled so as to be zero. In this case, the W/C pressure agrees with the M/C pressure. Namely, the W/C pressure is represented by the straight line L shown in FIG. 20. Thereafter, the producible regenerative braking force gradually decreases (refer to phase IV). The distributive braking force is obtained by subtracting the producible regenerative braking force from the assigned braking force. The valve opening pressure is controlled so as to correspond to the distributive braking force thus obtained. In this case, the W/C pressure varies in the range between the straight line H and the straight line L shown in FIG. 20.

In the sixth embodiment, the first check valve 352 serves as check valve of the present invention. The hydraulic pump 354 serves as pump of the present invention. The W/C linear valve 353 serves as the control valve of the present invention. The depression force sensor 41 serves as input value detecting means of the present invention. The brake ECU 40 serves as target vehicle braking force output means, assigned braking force output means, and brake control means of the present invention. In the flowchart of FIG. 22, the step S310 represents the processing performed by the target vehicle braking force output means, the step S320 represents the processing of the assigned braking force output means, and steps S340 to S360 represent the processing of the brake control means.

As described above, the sixth embodiment has the following effects.

①The hydraulic braking device always operates to attain the target vehicle braking force. Thus, it becomes possible to realize the cooperative control without using a conventional cooperative control valve or switching solenoid valves which selectively actuate or deactivate the hydraulic braking device. The hydraulic circuit arrangement can be simplified. Presence of the first check valve 352 ensures the fail safe mechanism.

②When the producible regenerative braking force is not smaller than the assigned braking force (i.e., requested regenerative braking force), all of the assigned braking force is supplied from the regenerative braking device. When the producible regenerative braking force is smaller than the assigned braking force, the hydraulic braking force is added as a supplement for filling a lack of braking force. In other words, the assigned braking force is supplied from the regenerative braking device as much as possible. This is effective to suppress the abrasion of the brake pad or the brake shoe used in the hydraulic braking device. The regeneration efficiency can be increased.

③ The brake fluid supply section 360 can be simplified by using the hydraulic pump 354 and the W/C linear valve 353.

④ The stroke simulator valve 356, generating a pedal stroke in response to a brake pedal input, improves the brake feeling.

⑤ When the M/C pressure exceeds the W/C pressure in response to the depression of the brake pedal BP, the W/C pressure can immediately agree with the M/C pressure by the presence of the first check valve 352. Thus, adequate brake response can be realized.

Furthermore, the above-described sixth embodiment can be modified to employ the hydraulic circuit arrangement shown in FIG. 21. The hydraulic circuit arrangement shown in FIG. 21 differs from the hydraulic circuit arrangement shown in FIG. 16 in that the second oil passage 306b and the W/C linear valve 353 are omitted and, instead, another oil passage 308 and the W/C linear valve 453 (normal close type) are provided. The oil passage 308 extends from the first check valve 352 to the reservoir 355. The W/C linear valve 453 is provided in the oil passage 308. In this case, the brake control is performed in the same manner as in the above-described sixth embodiment. The valve opening pressure control in the step S360 of FIG. 22 is performed in the following manner. When the producible regenerative braking force is a maximum value, i.e., when the producible regenerative braking force is equal to the requested regenerative braking force, the valve opening pressure of the W/C linear valve 453 is equalized to zero so that the W/C pressure agrees with the M/C pressure. When the producible regenerative braking force is a minimum value (i.e., zero), the valve opening pressure of the W/C linear valve 453 is equalized to the maximum value so that the hydraulic braking pressure agrees with the target vehicle braking force. Furthermore, when the producible regenerative braking force is an intermediate value between zero and the maximum value, the valve opening pressure of the W/C linear valve 453 is set to be a value between the minimum value and the maximum value. Thus, it is possible to obtain substantially the same effects as those of the above-described sixth embodiment.

The present invention should not be restricted to the above-described fifth and sixth embodiments. Therefore, this invention may be embodied in several forms without departing from the technical scope thereof.

For example, using the hydraulic circuit disclosed in the above-described fifth and sixth embodiment makes it possible to realize the so-called "variable jumping characteristics" as well as the so-called "buildup function" which are explained in the first and second embodiments.

Namely, the hydraulic circuit of the fifth and sixth embodiments can flexibly change the valve opening pressure of the W/C linear valve. This bring the same effects as the change of the boost ratio. Thus, it is possible to increase the valve opening pressure of the W/C linear valve with increasing vehicle traveling speed. The value of Pjump increases when the vehicle traveling speed is large. Hence, it becomes possible to reduce a difference of the brake stopping distance between a high-speed traveling condition and a low-speed traveling condition.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A vehicle braking apparatus for applying a braking force to a vehicle by summing a braking force of a hydraulic braking device and a braking force of an auxiliary braking device, said vehicle braking apparatus comprising:

input value detecting means for detecting a brake pedal input value;

target vehicle braking force output means for outputting a target vehicle braking force corresponding to said brake pedal input value detected by said input value detecting means;

assigned braking force output means for outputting an assigned braking force which is obtained by subtracting a minimum braking force of said hydraulic braking device corresponding to said brake pedal input value from said target vehicle braking force generated from said target vehicle braking force output means; and braking control means for obtaining a distributive braking force of said hydraulic braking device which is obtained by subtracting the braking force of said auxiliary braking device from said assigned braking force generated from said assigned braking force output means, and for controlling said hydraulic braking device based on a target hydraulic braking force which is a sum of said minimum braking force and said distributive braking force.

2. The vehicle braking apparatus in accordance with claim 1, wherein said braking control means is for supplying all of said assigned braking force from said auxiliary braking device when the braking force of said auxiliary braking device is not smaller than said assigned braking force and for adding said hydraulic braking force as a supplement for filling a lack of braking force when the braking force of said auxiliary braking device is smaller than said assigned braking force.

3. The vehicle braking apparatus in accordance with claim 1, wherein
said hydraulic braking device comprises a master cylinder and a booster provided at the upstream side of said master cylinder and equipped with a boost ratio changing mechanism,
and said braking control means adjusts a boost ratio of said booster when said braking control means controls said hydraulic braking device.

4. The vehicle braking apparatus in accordance with claim 3, wherein
said braking control means changes the boost ratio by forcibly changing a pedal input of said booster or by changing a pressure of operation fluid supplied to an operation chamber of a power piston of said booster.

5. The vehicle braking apparatus in accordance with claim 1, wherein said auxiliary braking device is a regenerative braking device.

6. A vehicle braking method for applying a braking force to a vehicle by summing a braking force of a hydraulic braking device and a braking force of an auxiliary braking device, said vehicle braking method comprising the steps of:
in attaining a target vehicle braking force corresponding to a brake pedal input value,
obtaining an assigned braking force by subtracting a minimum braking force of said hydraulic braking device corresponding to said brake pedal input value from said target vehicle braking force;
obtaining a distributive braking force of said hydraulic braking device by subtracting the braking force of said auxiliary braking device from said assigned braking force; and
controlling said hydraulic braking device based on a target hydraulic braking force which is a sum of said minimum braking force and said distributive braking force.

7. The vehicle braking method in accordance with claim 6, wherein
all of said assigned braking force is supplied from said auxiliary braking device when the braking force of said auxiliary braking device is not smaller than said assigned braking force and said hydraulic braking force is added as a supplement for filling a lack of braking force when the braking force of said auxiliary braking device is smaller than said assigned braking force.

8. The vehicle braking method in accordance with claim 6, wherein
said hydraulic braking device is controlled by adjusting a boost ratio of a booster provided at the upstream side of a master cylinder.

9. The vehicle braking method in accordance with claim 6, wherein said auxiliary braking device is a regenerative braking device.

10. A vehicle braking apparatus for applying a braking force to a vehicle by summing a braking force of a hydraulic braking device and a braking force of an auxiliary braking device, said vehicle braking apparatus comprising:
input value detecting means for detecting a brake pedal input value;
target vehicle braking force output means for outputting a target vehicle braking force corresponding to said brake pedal input value detected by said input value detecting means;
assigned braking force output means for outputting an assigned braking force which is obtained by subtracting a minimum braking force of said hydraulic braking device corresponding to said brake pedal input value from said target vehicle braking force generated from said target vehicle braking force output means; and
auxiliary brake operability judging means for judging whether or not said auxiliary brake device is operable; and
braking control means for responding to judgment result of said auxiliary brake operability judging means,
wherein when said auxiliary brake operability judging means judges that said auxiliary braking device is operable, said braking control means is for obtaining a distributive braking force of said hydraulic braking device which is obtained by subtracting the braking force of said auxiliary braking device from said assigned braking force generated from said assigned braking force output means, and for controlling said hydraulic braking device based on a target hydraulic braking force which is a sum of said minimum braking force and said distributive braking force,
and further when said auxiliary brake operability judging means judges that said auxiliary braking device is inoperable, said braking control means is for controlling said hydraulic braking device based on a target hydraulic braking force which is equal to said target vehicle braking force.

11. The vehicle braking apparatus in accordance with claim 10, wherein
said hydraulic braking device comprises:
a master cylinder; and
a booster provided at the upstream side of said master cylinder and equipped with a boost ratio changing mechanism,
and said braking control means adjusts a boost ratio of said booster when said braking control means controls said hydraulic braking device.

12. The vehicle braking apparatus in accordance with claim 11, wherein
said braking control means changes the boost ratio by forcibly changing a pedal input of said booster or by changing a pressure of operation fluid supplied to an operation chamber of a power piston of said booster.

13. The vehicle braking apparatus in accordance with claim 10, wherein said hydraulic braking device comprises:
a check valve provided in a first oil passage connecting a master cylinder to a wheel cylinder for maintaining a wheel cylinder pressure at a level not lower than a master cylinder pressure; and
brake fluid supply means for supplying a pressure regulated brake fluid to said wheel cylinder, and
said braking control means is for adjusting a pressure level of said brake fluid supplied from said brake fluid supply means to said wheel cylinder when said braking control means controls said hydraulic braking device.

14. The vehicle braking apparatus in accordance with claim 13, wherein said brake fluid supply means comprises:

a pump for supplying a pressurized brake fluid to said wheel cylinder; and a control valve provided in a second oil passage connecting said master cylinder to said wheel cylinder for maintaining said wheel cylinder pressure at a value larger than said master cylinder pressure by a valve opening pressure, said valve opening pressure being variable, and said braking control means is for adjusting the valve opening pressure of said control valve when said braking control means controls said hydraulic braking device.

15. The vehicle braking apparatus in accordance with claim 10, wherein said auxiliary braking device is a regenerative braking device.

* * * * *